(12) United States Patent
Choi et al.

(10) Patent No.: US 12,056,323 B2
(45) Date of Patent: Aug. 6, 2024

(54) DISPLAY DEVICE

(71) Applicant: Samsung Display Co., LTD., Yongin-si (KR)

(72) Inventors: Jae Uk Choi, Yongin-si (KR); Yun Ho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/304,122

(22) Filed: Apr. 20, 2023

(65) Prior Publication Data
US 2024/0077979 A1    Mar. 7, 2024

(30) Foreign Application Priority Data

Sep. 1, 2022   (KR) .......................... 10-2022-0110718

(51) Int. Cl.
*G06F 3/044*       (2006.01)
*G06F 3/041*       (2006.01)

(52) U.S. Cl.
CPC .......... *G06F 3/0446* (2019.05); *G06F 3/0412* (2013.01)

(58) Field of Classification Search
CPC .............................. G06F 3/0446; G06F 3/0412
See application file for complete search history.

(56) References Cited

U.S. PATENT DOCUMENTS 9,921,739 B2   3/2018 Dorfner
2021/0005677 A1*   1/2021 Lee ...................... G06F 3/0412

FOREIGN PATENT DOCUMENTS

JP         6103757 B2    3/2017
KR    10-2366237 B1     2/2022

* cited by examiner

*Primary Examiner* — Deeprose Subedi
(74) *Attorney, Agent, or Firm* — Lewis Roca Rothgerber Christie LLP

(57) ABSTRACT

A display device includes: a substrate; a display layer on the substrate; and a touch layer on the display layer, and including: a touch area; first sensor electrodes located along a first direction, and electrically connected to each other; second sensor electrodes located along a second direction crossing the first direction, and electrically connected to each other; and third sensor electrodes located along the first direction, and electrically insulated from the first and second sensor electrodes. In a first mode, the touch layer is to sense amounts of change in first capacitances between the first sensor electrodes and the second sensor electrodes, and in a second mode, the touch layer is to sense amounts of change in second capacitances between the first sensor electrodes and some of the second sensor electrodes, and amounts of change in third capacitances between the first sensor electrodes and the third sensor electrodes.

20 Claims, 28 Drawing Sheets

TSA2: SA1, SA2, SA3, SA4
PL: PL1, PL2

DISPLAY DEVICE

CROSS-REFERENCE TO RELATED APPLICATION

This application claims priority to and the benefit of Korean Patent Application No. 10-2022-0110718, filed on Sep. 1, 2022, in the Korean Intellectual Property Office, the entire disclosure of which is incorporated by reference herein.

BACKGROUND

1. Field

Aspects of embodiments of the present disclosure relate to a display device.

2. Description of the Related Art

As information society develops, demand for display devices for displaying images are increasing in various forms. For example, display devices are applied to various electronic devices, such as smartphones, digital cameras, notebook computers, navigation devices, and smart televisions.

A display device may include a touch sensing unit for sensing a user's touch as one of various input interfaces. The touch sensing unit may include a plurality of touch electrodes driven in a capacitive manner to sense a user's contact touch.

The above information disclosed in this Background section is for enhancement of understanding of the background of the present disclosure, and therefore, it may contain information that does not constitute prior art.

SUMMARY

In a capacitive method for detecting a user's contact touch, it may be difficult to increase a distance of a user's proximity touch that is adjacent above the display device.

One or more embodiments of the present disclosure are directed to a display device capable of detecting a contact input, as well as a proximity input.

However, the aspects and features of the present disclosure are not limited to those above. The above and other aspects and features of the present disclosure will become more apparent to those having ordinary skill in the art by referencing the detailed description, the figures, and the claims and their equivalents.

According to one or more embodiments of the present disclosure, a display device includes: a substrate; a display layer on the substrate, and including emission areas; and a touch layer on the display layer, and including: a touch area; first sensor electrodes located along a first direction, and electrically connected to each other; second sensor electrodes located along a second direction crossing the first direction, and electrically connected to each other, the second sensor electrodes being electrically insulated from the first sensor electrodes; and third sensor electrodes located along the first direction, and electrically insulated from the first sensor electrodes and the second sensor electrodes. In a first mode, the touch layer is configured to sense amounts of change in first capacitances between the first sensor electrodes and the second sensor electrodes, and in a second mode, the touch layer is configured to sense amounts of change in second capacitances between the first sensor electrodes and some of the second sensor electrodes, and amounts of change in third capacitances between the first sensor electrodes and the third sensor electrodes.

In an embodiment, the third sensor electrodes may be further located along the second direction, and the third sensor electrodes that are located along the first direction may be electrically connected to each other.

In an embodiment, the third sensor electrodes may be at least partially surrounded by the first sensor electrodes, respectively.

In an embodiment, the touch layer may further include conductive patterns surrounded by some of the first sensor electrodes and the second sensor electrodes, respectively, and the conductive patterns may be electrically insulated from the some of the first sensor electrodes and the second sensor electrodes.

In an embodiment, the display device may further include a first connection electrode electrically connecting the third sensor electrodes that are adjacent to each other in the first direction to each other, and the first connection electrode may be electrically insulated from the first sensor electrodes and the second sensor electrodes.

In an embodiment, the display device may further include a second connection electrode electrically connecting the second sensor electrodes that are adjacent to each other in the second direction to each other, and the second connection electrode may be electrically insulated from the first connection electrode.

In an embodiment, the first sensor electrodes, the second sensor electrodes, and the third sensor electrodes may not overlap with the emission areas.

In an embodiment, the first mode for sensing the first capacitances may be defined as a first sensing period, the second mode for sensing the second capacitances and the third capacitances may be defined as a second sensing period, and the first sensing period and the second sensing period may alternate with each other.

In an embodiment, the first sensing period may be longer than the second sensing period.

According to one or more embodiments of the present disclosure, a display device includes: a substrate; a display layer on the substrate, and including emission areas; and a touch layer on the display layer, and including: a touch area, the touch area including a first touch area configured to sense a touch input, and a second touch area configured to sense a touch input and a proximity input; first sensor electrodes at the first touch area and the second touch area, and located along a first direction; second sensor electrodes at the first touch area and the second touch area, and located along a second direction crossing the first direction; and third sensor electrodes at the second touch area, and located along the first direction. The first touch area is surrounded by the second touch area.

In an embodiment, the touch layer may further include a non-touch area at a side of the touch area, and the second touch area may be located within the touch area adjacent to the non-touch area.

In an embodiment, the third sensor electrodes may be surrounded by the first sensor electrodes, respectively.

In an embodiment, the second touch area may include a first sub-touch area extending in the first direction, and a second sub-touch area extending in the second direction, and the first sensor electrodes and the second sensor electrodes may be located at the first sub-touch area and the second sub-touch area, and the third sensor electrodes may be located at the second sub-touch area.

In an embodiment, in a first mode, the touch layer may be configured to sense amounts of change in first capacitances between the first sensor electrodes and the second sensor electrodes at the first touch area and the second touch area, and in a second mode, the touch layer may be configured to sense amounts of change in second capacitances between the first sensor electrodes and the second sensor electrodes at the first sub-touch area, and amounts of change in third capacitances between the first sensor electrodes and the third sensor electrodes at the second sub-touch area.

In an embodiment, the second touch area may further include: a third sub-touch area extending in the first direction, and not overlapping with the first sub-touch area; and a fourth sub-touch area extending in the second direction, and not overlapping with the third sub-touch area. The first sensor electrodes and the second sensor electrodes may be located at the third sub-touch area and the fourth sub-touch area, and the third sensor electrodes may be located at the fourth sub-touch area.

According to one or more embodiments of the present disclosure, a display device includes: a substrate; a display layer on the substrate, and including emission areas; and a touch layer on the display layer, and including: a touch area; first sensor electrodes located along a first direction, and electrically connected to each other; second sensor electrodes located along a second direction crossing the first direction, and electrically connected to each other, the second sensor electrodes being electrically insulated from the first sensor electrodes; third sensor electrodes located along the first direction, and electrically insulated from the first sensor electrodes and the second sensor electrodes; and fourth sensor electrodes located along the first direction, and electrically insulated from the first sensor electrodes, the second sensor electrodes, and the third sensor electrodes. In a first mode, the touch layer is configured to sense amounts of change in first capacitances between the first sensor electrodes and the second sensor electrodes, and in a second mode, the touch layer is configured to sense amounts of change in second capacitances between the first sensor electrodes and some of the second sensor electrodes, and amounts of change in third capacitances between the first sensor electrodes and the third and fourth sensor electrodes.

In an embodiment, the third sensor electrodes and the fourth sensor electrodes may be located along the second direction, the third sensor electrodes may be electrically connected to each other, and the fourth sensor electrodes may be electrically connected to each other.

In an embodiment, the third sensor electrodes and the fourth sensor electrodes may be alternately located along the second direction.

In an embodiment, the third sensor electrodes may be surrounded by the first sensor electrodes, and the fourth sensor electrodes may be surrounded by the second sensor electrodes.

In an embodiment, the display device may further include a third connection electrode electrically connecting the fourth sensor electrodes that are adjacent to each other in the first direction to each other, and the third connection electrode may be electrically insulated from the second sensor electrodes.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
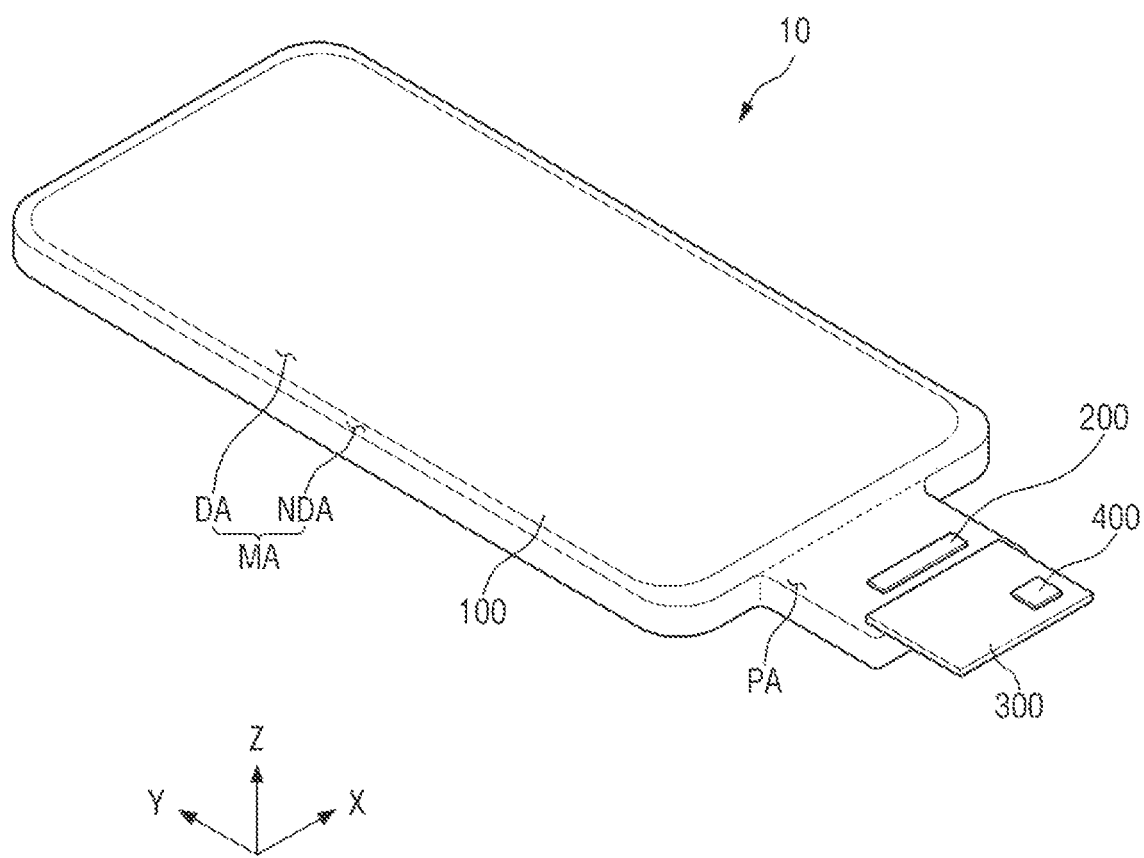
FIG. 1 is a perspective view of a display device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Unless otherwise noted, like reference numerals denote like elements throughout the attached drawings and the written description, and thus, redundant description thereof may not be repeated.

Unless otherwise specified, the illustrated embodiments are to be understood as providing features of varying detail of some ways in which embodiments of the present disclosure may be implemented in practice. Therefore, unless otherwise specified, the features, components, modules, layers, films, panels, regions, aspects, and/or the like (hereinafter individually or collectively referred to as "elements"), of the various embodiments may be otherwise combined, separated, interchanged, and/or rearranged without departing from spirit and scope of the present disclosure.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the drawings, the use of cross-hatching and/or shading is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, and/or the like of the elements, unless otherwise specified.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

As is customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed by using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein, and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the spirit and scope of the present disclosure. Further, the blocks, units, parts, and/or modules of some embodiments may be physically combined into more complex blocks, units, parts, and/or modules, without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
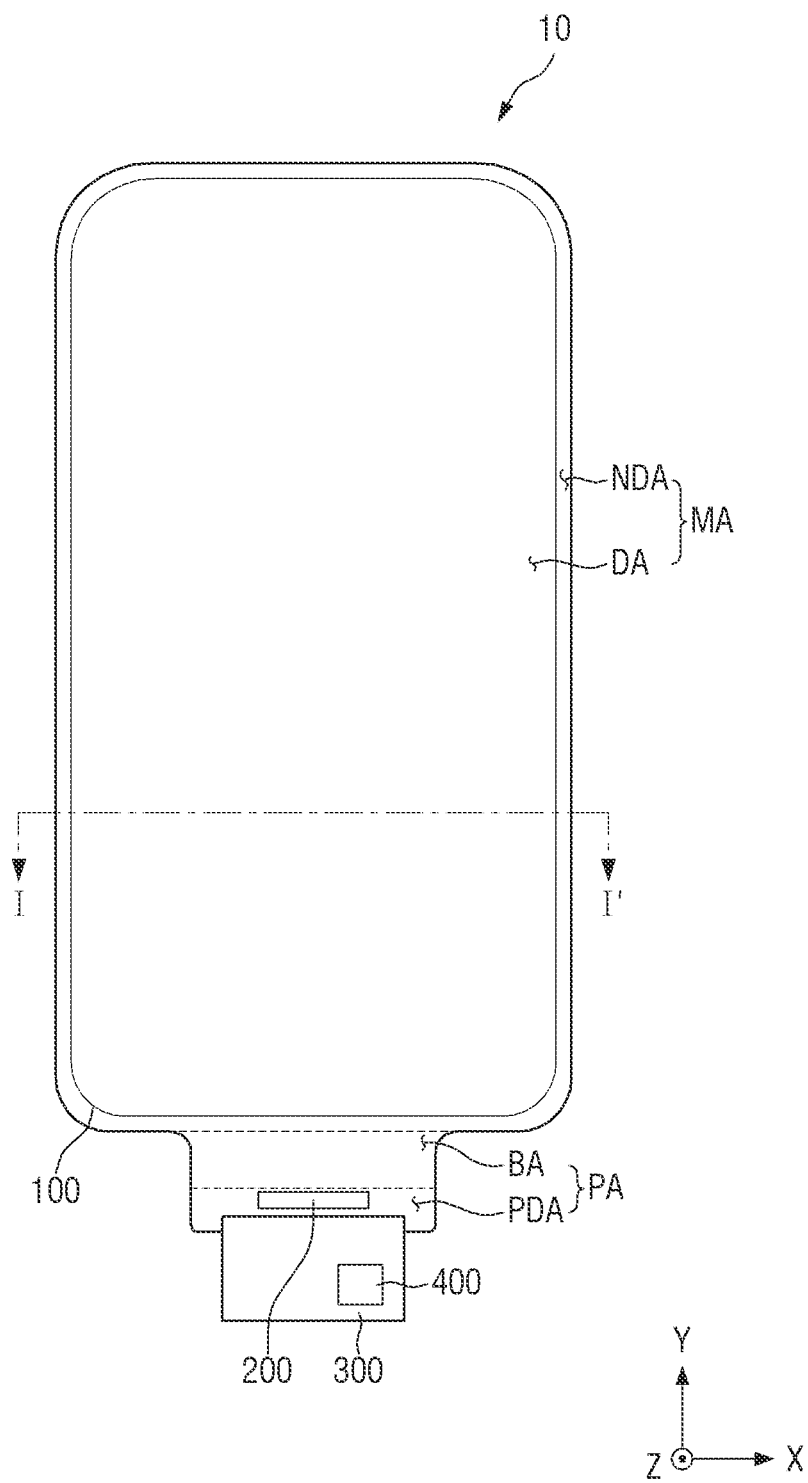
FIG. 2 is a plan view of the display device according to an embodiment.
Figure 3:
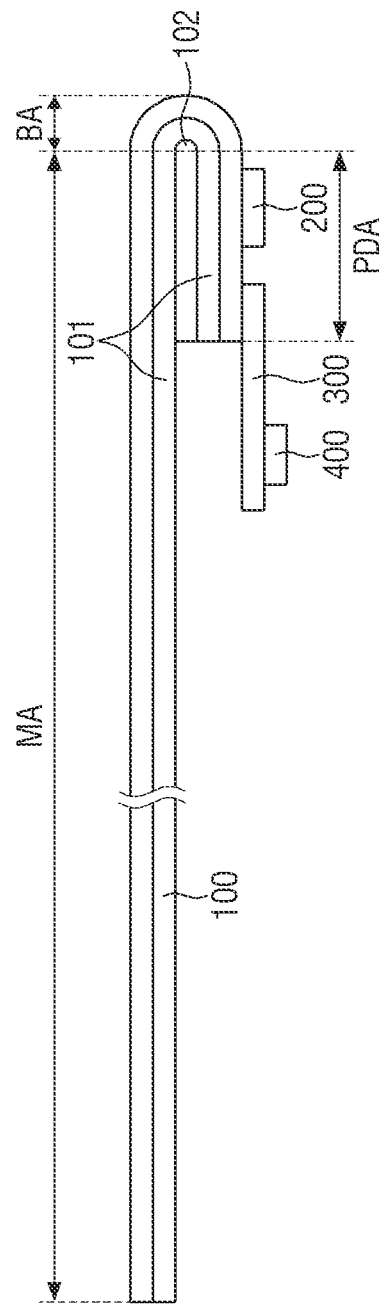
FIG. 3 is a side view of the display device according to an embodiment.

FIG. 1 is a perspective view of a display device 10 according to an embodiment. FIG. 2 is a plan view of the display device 10 according to an embodiment. FIG. 3 is a side view of the display device 10 according to an embodiment.

As used in the present specification, the terms "above," "top," and "upper surface" refer to an upward direction (e.g., a Z-axis direction) from a display panel 100, and the terms "below," "bottom," and "lower surface" refer to a downward direction (e.g., a direction opposite to the Z-axis direction) from the display panel 100. In addition, the terms "left," "right," "upper," and "lower" refer to directions when the display panel 100 is viewed in a plan view. For example, the term "left" refers to a direction opposite to an X-axis direction, the term "right" refers to the X-axis direction, the term "upper" refers to a Y-axis direction, and the term "lower" refers to a direction opposite to the Y-axis direction.

Referring to FIGS. 1 and 2, the display device 10 is a device for displaying moving images and/or still images. The display device 10 may be used as a display screen in various suitable portable electronic devices, such as mobile phones, smartphones, tablet personal computers (PCs), smart watches, watch phones, mobile communication terminals, electronic notebooks, electronic books, portable multimedia players (PMPs), navigation devices, and ultra-mobile PCs (UMPCs), as well as in various suitable products, such as televisions, notebook computers, monitors, billboards, and Internet of things (IoT) devices. The display device 10 may be any suitable one of an organic light emitting display device, a liquid crystal display device, a plasma display device, a field emission display device, an electrophoretic display device, an electrowetting display device, a quantum dot light emitting display device, or a micro light emitting diode display device. Hereinafter, for convenience, the display device 10 may be mainly described in more detail in the context of an organic light emitting display device, but the present disclosure is not limited thereto.

The display device 10 according to an embodiment includes a display panel 100, a display driving circuit 200, a circuit board 300, and a touch driving circuit 400.

The display panel 100 may include a main area MA, and a protruding area PA protruding from a side of the main area MA.

The main area MA may be shaped like a rectangular plane having short sides extending in a first direction (e.g., the X-axis direction), and long sides extending in a second direction (e.g., the Y-axis direction) crossing (e.g., intersecting) the first direction (e.g., the X-axis direction). Each corner where a short side extending in the first direction (e.g., the X-axis direction) meets a long side extending in the second direction (e.g., the Y-axis direction) may be rounded to have a suitable curvature (e.g., a predetermined curvature), or may be right-angled. The planar shape of the display device 10 is not limited to a quadrilateral shape, and the display device 10 may have any suitable shape, such as another polygonal shape, a circular shape, or an oval shape. The main area MA may be formed to be flat or substantially flat. However, the present disclosure is not limited thereto, and the main area MA may include curved portions formed at left and right ends (e.g., left and right sides) thereof. In this case, the curved portions may have a constant or substantially constant curvature, or a varying curvature.

The main area MA may include a display area DA where pixels are formed to display an image, and a non-display area NDA located around (e.g., adjacent to) the display area DA.

The pixels, as well as scan lines, data lines, and power lines connected to the pixels, may be disposed at (e.g., in or on) the display area DA. When the main area MA includes the curved portions, the display area DA may be disposed at (e.g., in or on) the curved portions. In this case, an image of the display panel 100 may also be viewed in the curved portions.

The non-display area NDA may be defined as an area extending from the outside of the display area DA to the edges of the display panel 100. A scan driver for transmitting scan signals to scan lines, and link lines connecting data lines and the display driving circuit 200 to each other may be disposed at (e.g., in or on) the non-display area NDA.

The protruding area PA may protrude from a side of the main area MA. For example, the protruding area PA may protrude from a lower side of the main area MA as illustrated in FIG. 2. A length (or a width) of the protruding area PA in the first direction (e.g., the X-axis direction) may be smaller than a length (or a width) of the main area MA in the first direction (e.g., the X-axis direction).

The protruding area PA may include a bending area BA and a pad area PDA. In this case, the pad area PDA may be disposed on a side of the bending area BA, and the main area MA may be disposed on another side (e.g., an opposite side) of the bending area BA. For example, the pad area PDA may be disposed on a lower side of the bending area BA, and the main area MA may be disposed on an upper side of the bending area BA.

The display panel 100 may be formed to be flexible to be curved, bent, folded, or rolled. Therefore, the display panel 100 may be bent in the bending area BA in a thickness direction (e.g., the Z-axis direction). A surface of the pad area PDA of the display panel 100 faces upward before the display panel 100 is bent as illustrated in FIG. 2. After the display panel 100 is bent as illustrated in FIG. 3, the surface of the pad area PDA of the display panel 100 faces downward. Accordingly, the pad area PDA may be disposed under the main area MA, and may overlap with (e.g., may be overlapped by) the main area MA.

Pads electrically connected to the display driving circuit 200 and the circuit board 300 may be disposed on the pad area PDA of the display panel 300.

An under-panel cover 101 may be disposed under the display panel 100. The under-panel cover 101 may be attached to a lower surface of the display panel 100 by an adhesive member. The adhesive member may be a pressure sensitive adhesive (PSA).

The under-panel cover 101 may include a light absorbing member for absorbing light incident from the outside, a buffer member for absorbing an external shock, and a heat dissipation member for efficiently dissipating heat of the display panel 100.

The light absorbing member may be disposed under the display panel 100. The light absorbing member blocks transmission of light to prevent or substantially prevent the elements disposed under the light absorbing member, for example, such as the circuit board 300, from being viewed from above the display panel 100. The light absorbing member may include a light absorbing material, such as a black pigment or dye.

The buffer member may be disposed under the light absorbing member. The buffer member absorbs an external shock to prevent or substantially prevent the display panel 100 from being damaged. The buffer member may include (e.g., may be composed of) a single layer or a plurality of layers. For example, the buffer member may include (e.g., may be made of) a polymer resin, such as polyurethane, polycarbonate, polypropylene, or polyethylene, or may include (e.g., may be made of) an elastic material, such as rubber, a urethane-based material, or a sponge formed by foaming an acrylic material. The buffer member may be a cushion layer.

The heat dissipation member may be disposed under the buffer member. The heat dissipation member may include a first heat dissipation layer including graphite or carbon nanotubes, and a second heat dissipation layer including (e.g., formed of) a thin metal film, such as copper, nickel, ferrite, or silver, capable of shielding electromagnetic waves, and having a suitable thermal conductivity (e.g., excellent thermal conductivity).

Referring to FIG. 3, the pad area PDA may be disposed under the main area MA. Because the pad area PDA is disposed under the main area MA by the bending the display panel 100 in the bending area BA, the pad area PDA may overlap with (e.g., may be overlapped by) the main area MA. Therefore, the under-panel cover 101 disposed at (e.g., in or on) the main area MA of the display panel 100 and the under-panel cover 101 disposed at (e.g., in or on) the pad area PDA of the display panel 100 may be attached to each other by an adhesive member 102. The adhesive member 102 may be a PSA.

The display driving circuit 200 outputs signals and voltages for driving the display panel 100. For example, the display driving circuit 200 may supply data voltages to the data lines. In addition, the display driving circuit 200 may supply power supply voltages to the power lines, and may supply scan control signals to the scan driver. The display driving circuit 200 may be formed as an integrated circuit, and may be mounted on the pad area PDA of the display panel 100 using a chip on glass (COG) method, a chip on plastic (COP) method, or an ultrasonic bonding method. However, the present disclosure is not limited thereto. For example, the display driving circuit 200 may be mounted on the circuit board 300.

The pads may include display pads electrically connected to the display driving circuit 200, and touch pads electrically connected to touch lines.

The circuit board 300 may be attached onto the pads using an anisotropic conductive film. Therefore, lead lines of the circuit board 300 may be electrically connected to the pads. The circuit board 300 may be a flexible printed circuit board, a printed circuit board, or a flexible film, such as a chip on film.

The touch driving circuit 400 may be connected to sensor electrodes of a touch sensing layer TSL (e.g., see FIG. 4) of the display panel 100. The touch driving circuit 400 transmits driving signals to the sensor electrodes, and measures mutual capacitance values of the sensor electrodes. Each of the driving signals may be a signal having a plurality of driving pulses. The touch driving circuit 400 may determine an occurrence of a user's touch and/or proximity based on the mutual capacitance values. The user's touch indicates that an object, such as the user's finger or a pen, directly contacts a surface of the display device 10 disposed on the touch sensing layer TSL. The user's proximity indicates that an object, such as the user's finger or a pen, hovers above the surface of the display device 10.

The touch driving circuit 400 may be disposed on the circuit board 300. The touch driving circuit 400 may be formed as an integrated circuit, and mounted on the circuit board 300.

Figure 4:
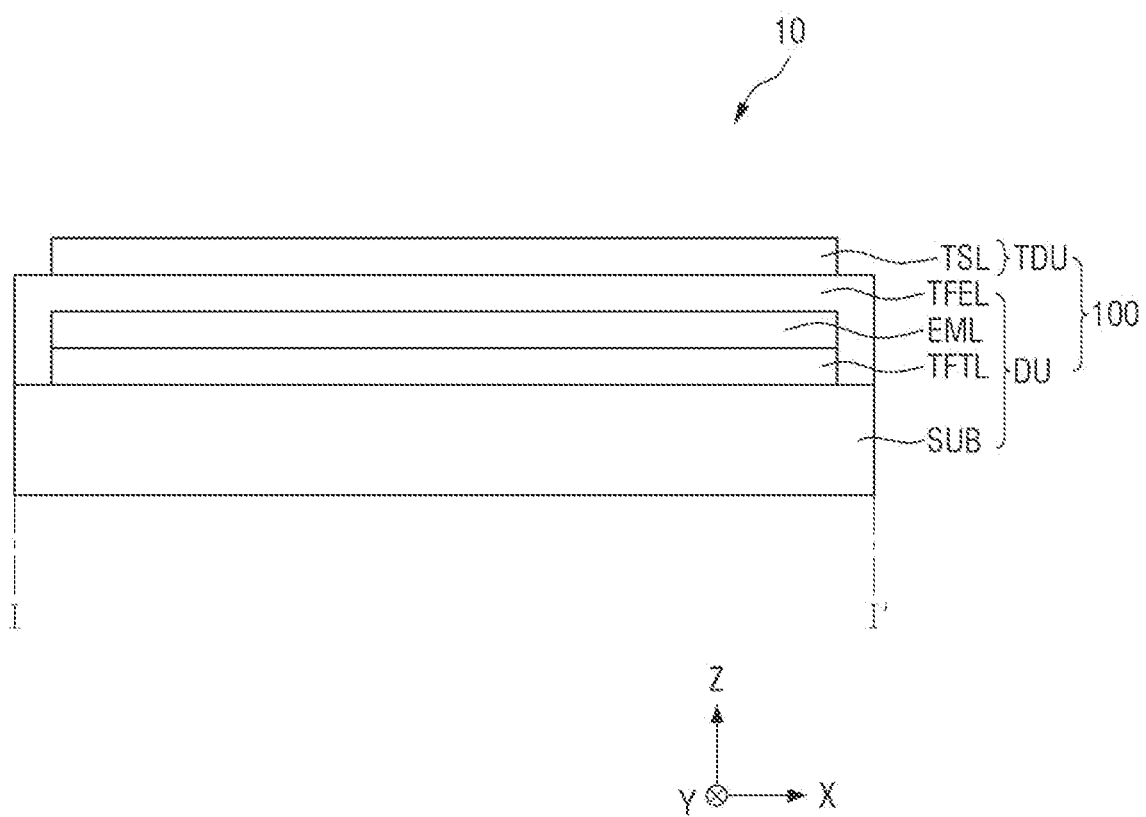
FIG. 4 is a cross-sectional view taken along the line I-I' of FIG. 2.

FIG. 4 is a cross-sectional view taken along the line I-I' of FIG. 2.

Referring to FIG. 4, the display panel 100 may include a substrate SUB, a thin-film transistor layer TFTL disposed on the substrate SUB, a light emitting element layer EML, a thin-film encapsulation layer TFEL, and the touch sensing layer TSL.

The substrate SUB may include (e.g., may be made of) an insulating material, such as glass, quartz, or a polymer resin. The polymer material may be, for example, polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or a suitable combination thereof. As another example, the substrate SUB may include a metal material.

The substrate SUB may be a rigid substrate, or a flexible substrate that may be bent, folded, or rolled. When the substrate SUB is a flexible substrate, the substrate SUB may include (e.g., may be made of), but not limited to, polyimide (PI).

Figure 5:
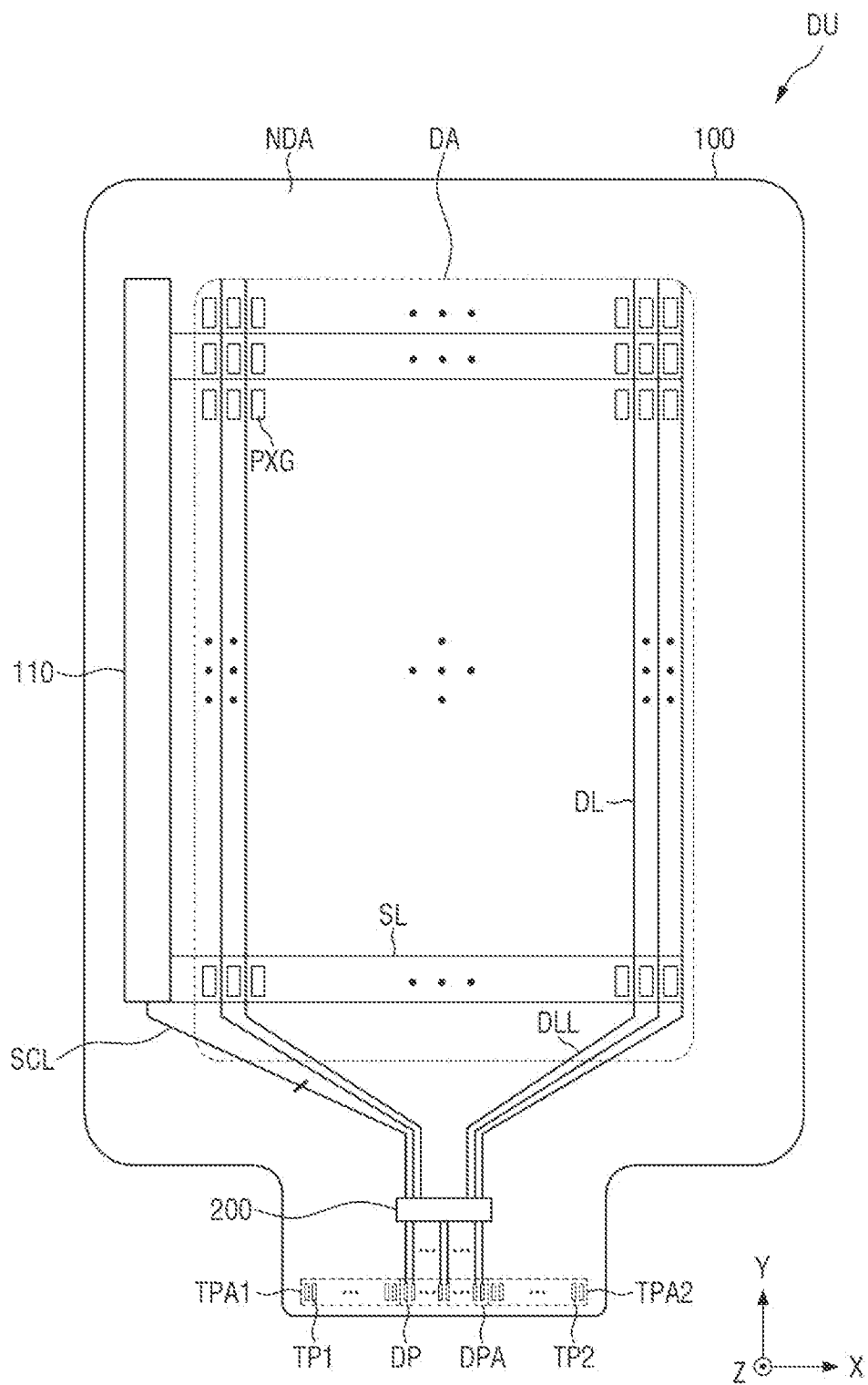
FIG. 5 is a plan view of a display panel according to an embodiment.

The thin-film transistor layer TFTL may be disposed on the substrate SUB. In the thin-film transistor layer TFTL, thin-film transistors of the pixels may be formed, as well as scan lines, data lines, power lines, scan control lines, and routing lines connecting pads and the data lines to each other may be formed. Each of the thin-film transistors may include a gate electrode, a semiconductor layer, a source electrode, and a drain electrode. When a scan driver 110 is formed at (e.g., in or on) the non-display area NDA of the display panel 100 as illustrated in FIG. 5, the scan driver 110 may also include thin-film transistors.

The thin-film transistor layer TFTL may be disposed at (e.g., in or on) the display area DA and the non-display area NDA. In more detail, the thin-film transistors of the pixels, the scan lines, the data lines, and the power lines of the thin-film transistor layer TFTL may be disposed at (e.g., in or on) the display area DA. The scan control lines and link lines of the thin-film transistor layer TFTL may be disposed at (e.g., in or on) the non-display area NDA.

The light emitting element layer EML may be disposed on the thin-film transistor layer TFTL. The light emitting element layer EML may include the pixels, and a pixel defining layer defining the pixels. Each of the pixels may include a first electrode, a light emitting layer, and a second electrode. The light emitting layer may be an organic light emitting layer including an organic material. In this case, the light emitting layer may include a hole transporting layer, an organic light emitting layer, and an electron transporting layer. When a suitable voltage (e.g., a predetermined voltage) is applied to the first electrode and a cathode voltage is applied to the second electrode through a thin-film transistor of the thin-film transistor layer TFTL, holes and electrons move to the organic light emitting layer through the hole transporting layer and the electron transporting layer, respectively, and combine together in the organic light emitting layer to emit light. The pixels of the light emitting element layer EML may be disposed at (e.g., in or on) the display area DA.

The thin-film encapsulation layer TFEL may be disposed on the light emitting element layer EML. The thin-film encapsulation layer TFEL prevents or substantially prevents oxygen and/or moisture from penetrating into the light emitting element layer EML. For example, the thin-film encapsulation layer TFEL may include at least one inorganic layer. The inorganic layer may be, but is not limited to, a silicon nitride layer, a silicon oxynitride layer, a silicon oxide layer, a titanium oxide layer, or an aluminum oxide layer. In addition, the thin-film encapsulation layer TFEL protects the light emitting element layer EML from foreign substances, such as dust. For example, the thin-film encapsulation layer TFEL may include at least one organic layer. The organic layer may be, but is not limited to, an acryl resin, an epoxy resin, a phenolic resin, a polyamide resin, or a polyimide resin.

The thin-film encapsulation layer TFEL may be disposed at (e.g., in or on) both the display area DA and the non-display area NDA. In more detail, the thin-film encapsulation layer TFEL may cover the light emitting element layer EML of the display area DA and the non-display area NDA, and may cover the thin-film transistor layer TFTL of the non-display area NDA.

The touch sensing layer TSL may be disposed on the thin-film encapsulation layer TFEL. Because the touch sensing layer TSL is directly disposed on the thin-film encapsulation layer TFEL, a thickness of the display device 10 may be reduced as compared with when a separate touch panel including the touch sensing layer TSL is attached onto the thin-film encapsulation layer TFEL.

Figure 6:
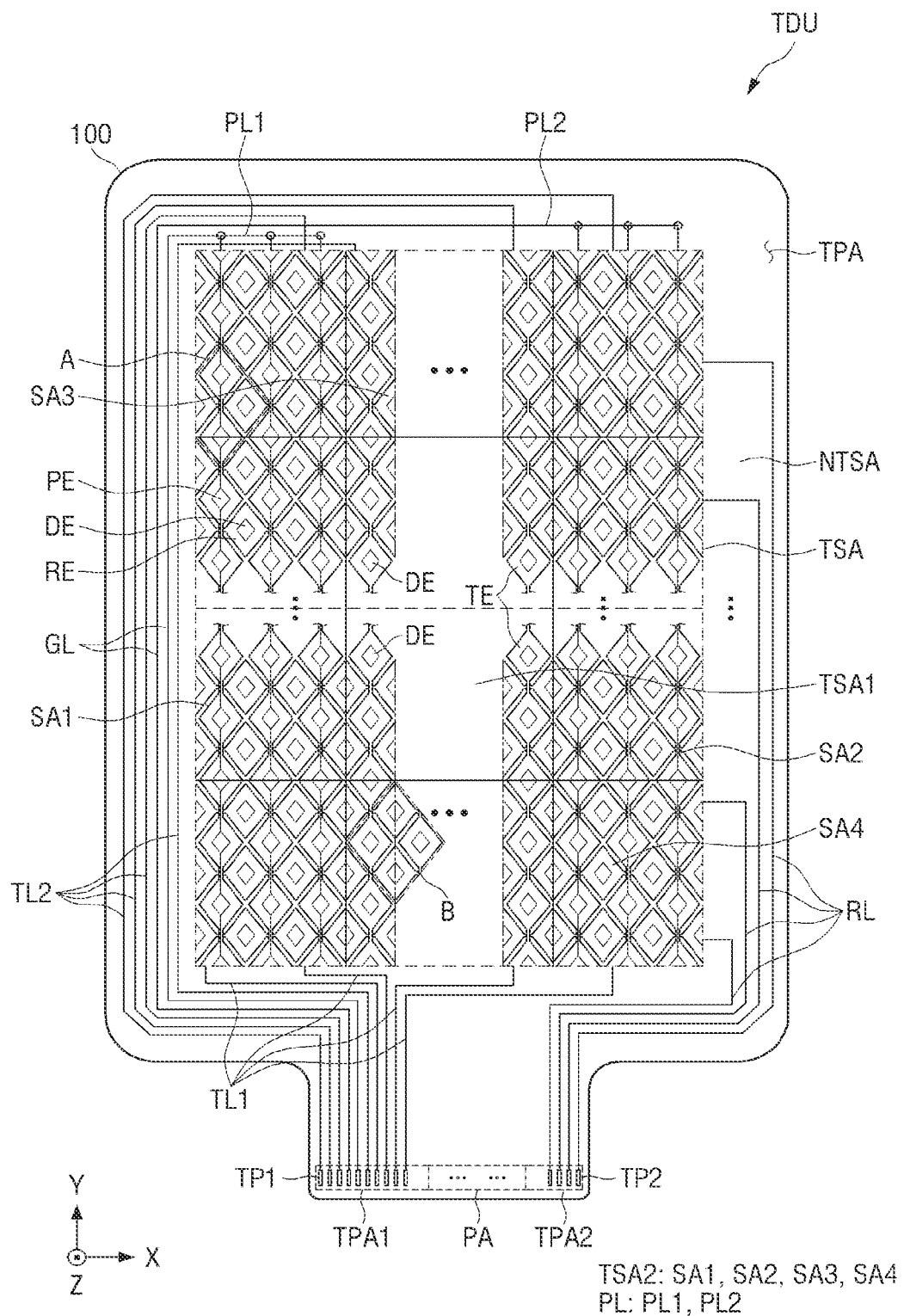
FIG. 6 is a plan view of a touch sensing unit according to an embodiment.

The touch sensing layer TSL may include sensor electrodes for sensing a user's touch in a mutual capacitance manner, and touch lines connecting the pads and the sensor electrodes to each other. The sensor electrodes of the touch sensing layer TSL may be disposed at (e.g., in or on) a touch sensing area TSA overlapping with the display area DA as illustrated in FIG. 6. The touch lines of the touch sensing layer TSL may be disposed at (e.g., in or on) a non-touch area NTSA overlapping with the non-display area NDA as illustrated in FIG. 6.

A polarizing film may be disposed on the touch sensing layer TSL. The polarizing film may include a linear polarizer, and a retardation film, such as a quarter-wave (λ/4) plate. In this case, the retardation film may be disposed on the touch sensing layer TSL, and the linear polarizer may be disposed on the retardation film. In addition, a cover window may be disposed on the polarizing film. The cover window may be attached onto the polarizing film by a transparent adhesive member, such as an optically clear adhesive (OCA) film.

FIG. 5 is a plan view of a display panel 100 according to an embodiment.

In FIG. 5, for convenience of illustration, pixels PXG, scan lines SL, data lines DL, scan control lines SCL, fan-out lines DLL, the scan driver 110, the display driving circuit 200, and display pads DP are illustrated in more detail, and other elements may not be shown.

Referring to FIG. 5, the scan lines SL, the data lines DL, and the pixels PXG are disposed at (e.g., in or on) the display area DA. The scan lines SL may extend in the first direction (e.g., the X-axis direction) and may be parallel to or substantially parallel to each other, and the data lines DL may extend in the second direction (e.g., the Y-axis direction) crossing the first direction (e.g., the X-axis direction) and may be parallel to or substantially parallel to each other.

Each of the pixels PXG may be connected to at least any one of the scan lines SL and any one of the data lines DL. Each of the pixels PXG may include thin-film transistors including a driving transistor and at least one switching transistor, a light emitting element, and a capacitor. Each of the pixels PXG may receive a data voltage of a data line DL in response to a scan signal transmitted from a scan line SL, and may supply a driving current to the light emitting element according to the data voltage applied to a gate electrode, thereby emitting light. Although the light emitting element is mainly described as an organic light emitting element including an anode, an organic light emitting layer, and a cathode, the present disclosure is not limited thereto. The light emitting element may be implemented as a quantum dot light emitting element including an anode, a quantum dot light emitting layer, and a cathode, an inorganic light emitting element including an anode, an inorganic light emitting layer having an inorganic semiconductor, and a cathode, or a micro light emitting element including a micro light emitting diode.

The scan driver 110 is connected to the display driving circuit 200 through the scan control lines SCL. Therefore, the scan driver 110 may receive a scan control signal of the display driving circuit 200. The scan driver 110 generates the scan signals according to the scan control signal, and supplies the scan signals to the scan lines SL.

The display driving circuit 200 is connected to the display pads DP to receive digital video data and timing signals. The display driving circuit 200 converts the digital video data into analog positive/negative data voltages, and supplies the data voltages to the data lines DL through the fan-out lines DLL. In addition, the display driving circuit 200 generates a scan control signal for controlling the scan driver 110, and supplies the generated scan control signal to the scan driver 110 through the scan control lines SCL. The pixels PXG to be supplied with the data voltages are selected by the scan signals of the scan driver 110, and the data voltages are supplied to the selected pixels PXG. The display driving circuit 200 may be formed as an integrated circuit, and attached onto the substrate SUB using a COG method, a COP method, or an ultrasonic bonding method. However, the present disclosure is not limited thereto. For example, the display driving circuit 200 may be mounted on the circuit board 300.

As illustrated in FIG. 5, the display panel 100 may include the display pads DP electrically connected to the display driving circuit 200, and touch pads TP1 and TP2 electrically connected to the touch lines. A display pad area DPA where the display pads DP are disposed may be disposed between a first touch pad area TPA1 where first touch pads TP1 are disposed and a second touch pad area TPA2 where second touch pads TP2 are disposed. As illustrated in FIG. 5, the display pad area DPA may be disposed at a center of an end of the protruding area PA, the first touch pad area TPA1 may be disposed on a left side of the end of the protruding area PA, and the second touch pad area TPA2 may be disposed on a right side of the end of the protruding area PA.

Figure 7:
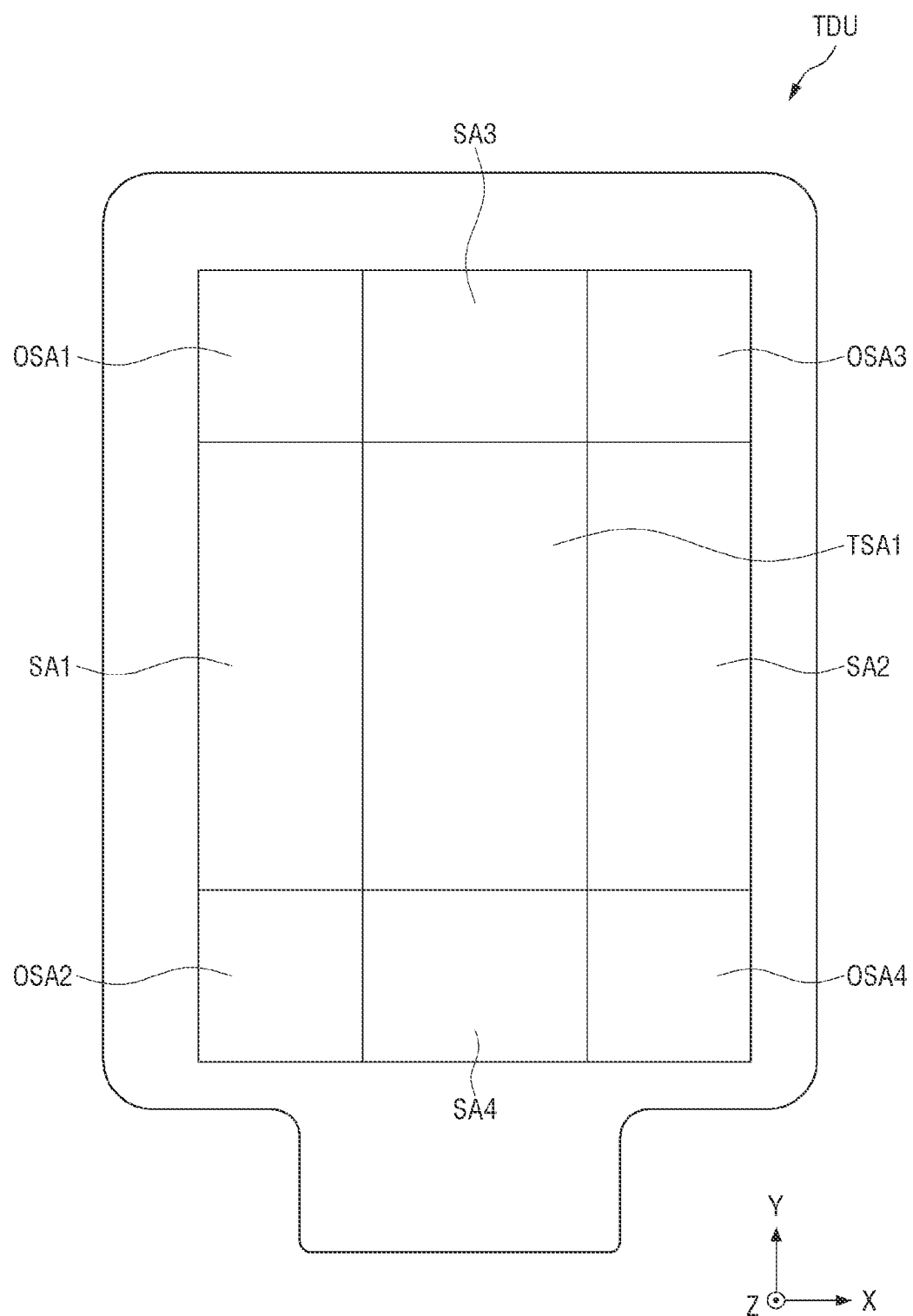
FIG. 7 is a schematic diagram of a touch area illustrated in FIG. 6.

FIG. 6 is a plan view of a touch sensing unit TDU according to an embodiment. FIG. 7 is a schematic diagram of a touch area TSA illustrated in FIG. 6.

In FIG. 6, for convenience of illustration, sensor electrodes TE, RE, and PE and conductive patterns DE that are disposed at (e.g., in or on) the touch area TSA, and touch lines TL, RL, and PL and the touch pads TP1 and TP2 that are disposed at (e.g., in or on) a non-touch area NTSA are illustrated, and other elements may not be shown.

Referring to FIG. 6, the touch sensing unit (e.g., the touch sensor, touch layer, or touch sensing panel) TDU includes the touch area TSA for sensing a user's touch, and the non-touch area NTSA disposed around (e.g., adjacent to) the touch area TSA. The non-touch area NTSA may surround (e.g., around a periphery of) the touch area TSA. The touch area TSA may overlap with the display area DA of a display unit (e.g., a display, display layer, or display panel) DU, and the non-touch area NTSA may overlap with the non-display area NDA of the display unit DU.

The touch area TSA includes a first touch area TSA1 for sensing a contact touch, and a second touch area TSA2 for sensing a contact touch and for sensing whether a person or an object is in proximity thereto. In other words, in a first mode, a touch may be sensed in the first touch area TSA1 and the second touch area TSA2. In a second mode, a proximity touch may be sensed in the second touch area TSA2.

The second touch area TSA2 may be disposed in (e.g., within) the touch area TSA adjacent to the non-touch area NTSA. For example, the second touch area TSA2 may be disposed at opposite ends of the touch area TSA in the first direction (e.g., the X-axis direction), and may be disposed at opposite ends of the touch area TSA in the second direction (e.g., the Y-axis direction). In other words, the second touch area TSA2 may be disposed to be adjacent to the non-touch area NTSA. Accordingly, the second touch area TSA2 may be disposed to be adjacent to the non-touch area NTSA, and may be surrounded (e.g., around a periphery thereof) by the non-touch area NTSA.

The second touch area TSA2 may include a first sub-touch area SA1, a second sub-touch area SA2, a third sub-touch area SA3, and a fourth sub-touch area SA4. The first sub-touch area SA1 and the second sub-touch area SA2 may be areas for sensing mutual capacitances between driving electrodes TE and proximity sensing electrodes PE from among the sensor electrodes TE, RE, and PE. The third sub-touch area SA3 and the fourth sub-touch area SA4 may be areas for sensing mutual capacitances between the driving electrodes TE and sensing electrodes RE from among the sensor electrodes TE, RE, and PE. The first sub-touch area SA1 and the second sub-touch area SA2 may extend in the second direction (e.g., the Y-axis direction), and the third sub-touch area SA3 and the fourth sub-touch area SA4 may extend in the first direction (e.g., the X-axis direction). For example, as illustrated in the embodiment of FIG. 6, the first sub-touch area SA1 may extend in the second direction (e.g., the Y-axis direction), and may be located in a left area of the second touch area TSA2. The second sub-touch area SA2 may extend in the second direction (the Y-axis direction), and may be located in a right area of the second touch area TSA2. In addition, the third sub-touch area SA3 may extend in the first direction (e.g., the X-axis direction), and may be located in an upper area of the second touch area TSA2. The fourth sub-touch area SA4 may extend in the first direction (e.g., the X-axis direction), and may be located in a lower area of the second touch area TSA2.

Each of the first through fourth sub-touch areas SA1 through SA4 may be disposed in (e.g., within) the touch area TSA adjacent to the non-touch area NTSA. For example, as illustrated in the embodiment of FIG. 6, the first sub-touch area SA1 may be disposed on a left side of the touch area TSA to be adjacent to the non-touch area NTSA, and the second sub-touch area SA2 may be disposed on a right side of the touch area TSA to be adjacent to the non-touch area NTSA. In addition, the third sub-touch area SA3 may be disposed on an upper side of the touch area TSA to be adjacent to the non-touch area NTSA, and the fourth sub-touch area SA4 may be disposed on a lower side of the touch area TSA to be adjacent to the non-touch area NTSA.

In the second mode, mutual capacitances may be sensed in each of the first through fourth sub-touch areas SA1 through SA4 to sense a proximity touch. In response to the proximity touch, location information of a user or an object may be measured based on a magnitude of each mutual capacitance value, an amount of change in each mutual capacitance value, and a difference between the mutual capacitance values. In this case, as the difference between the mutual capacitance values increases, the location information of the user or the object may be measured more accurately. Therefore, the greater the distance between the first through fourth sub-touch areas SA1 through SA4, the better the accuracy of the proximity sensing. In other words, the first through fourth sub-touch areas SA1 through SA4 may be disposed at ends (e.g., at opposite ends) of the touch area TSA. However, the present disclosure is not limited thereto, and any of the first through fourth sub-touch areas SA1 through SA4 may not be adjacent to the non-touch area NTSA.

Referring further to FIG. 7, at least a portion of the first sub-touch area SA1 may overlap with the third sub-touch area SA3, and another portion of the first sub-touch area SA1 may overlap with the fourth sub-touch area SA4. For example, in the first sub-touch area SA1, an area on a side of the first sub-touch area SA1 may include a first overlap area OSA1 overlapping with the third sub-touch area SA3. An area on another side of the sub-touch area SA1 may include a second overlap area OSA2 overlapping with the fourth sub-touch area SA4. In addition, at least a portion of the second sub-touch area SA2 may include a third overlap area OSA3 overlapping with the third sub-touch area SA3, and another portion of the second sub-touch area SA2 may include a fourth overlap area OSA4 overlapping with the fourth sub-touch area SA4. In other words, the first overlap area OSA1 of the third sub-touch area SA3 may overlap with the first sub-touch area SA1, and the third overlap area OSA3 of the third sub-touch area SA3 may overlap with the second sub-touch area SA2. In addition, the second overlap area OSA2 of the fourth sub-touch area SA4 may overlap with the first sub-touch area SA1, and the fourth overlap area OSA4 of the fourth sub-touch area SA4 may overlap with the second sub-touch area SA2. Although all of the first through fourth sub-touch areas SA1 through SA4 are illustrated in FIGS. 6 and 7 as overlapping with another, the present disclosure is not limited thereto, and at least two of the first through fourth sub-touch areas SA1 through SA4 may overlap with each other.

The first touch area TSA1 may be surrounded (e.g., around a periphery thereof) by the second touch area TSA2. When the second touch area TSA2 is disposed in (e.g., within) the touch area TSA adjacent to the non-touch area NTSA as described above, the first touch area TSA1 may be disposed in (e.g., within) the touch area TSA that is not adjacent to the non-touch area NTSA. For example, the first touch area TSA1 may be adjacent to the first through fourth sub-touch areas SA1 through SA4, and may be surrounded (e.g., around a periphery thereof) by the first through fourth sub-touch areas SA1 through SA4. In addition, the first touch area TSA1 may be adjacent to the second touch area TSA2. However, the present disclosure is not limited thereto, and at least a portion of the first touch area TSA1 may also be disposed in (e.g., within) the touch area TSA adjacent to the non-touch area NTSA.

The sensor electrodes TE, RE, and PE disposed in the first touch area TSA1 and the second touch area TSA2 will be described in more detail hereinafter.

First sensor electrodes TE and second sensor electrodes RE may be disposed at (e.g., in or on) the first touch area TSA1 and the second touch area TSA2. In addition, third sensor electrodes PE may be disposed in a portion of the second touch area TSA2.

The sensor electrodes TE, RE, and PE may include the first sensor electrodes TE, the second sensor electrodes RE, and the third sensor electrodes PE. In the embodiment illustrated in FIG. 6, a case where the first sensor electrodes are the driving electrodes TE, the second sensor electrodes are the sensing electrodes RE, and the third sensor electrodes are the proximity sensing electrodes PE is mainly illustrated for convenience.

The sensing electrodes RE and the driving electrodes TE may be disposed at (e.g., in or on) the first touch area TSA1 and the second touch area TSA2. For example, the sensing electrodes RE may be disposed along the first direction (e.g., the X-axis direction), and may be electrically connected to each other. The sensing electrodes RE may be arranged along the first direction (e.g., the X-axis direction) at (e.g., in or on) the touch area TSA. The driving electrodes TE may be disposed along the second direction (e.g., the Y-axis direction) crossing the first direction (e.g., the X-axis direction), and may be electrically connected to each other. The driving electrodes TE may be arranged along the second direction (e.g., the Y-axis direction) at (e.g., in or on) the touch area TSA.

The proximity sensing electrodes PE may be disposed at (e.g., in or on) a portion of the second touch area TSA2. The proximity sensing electrodes PE may be disposed along the second direction (e.g., the Y-axis direction), and may be electrically connected to each other. For example, the proximity sensing electrodes PE may be disposed in the first sub-touch area SA1 and the second sub-touch area SA2 along the second direction (e.g., the Y-axis direction). In addition, the proximity sensing electrodes PE may be arranged along the first direction (e.g., the X-axis direction). In other words, the proximity sensing electrodes PE may extend in the second direction (e.g., the Y-axis direction), and may be arranged along the first direction (e.g., the X-axis direction). In other words, the proximity sensing electrodes PE may be arranged at (e.g., in or on) each of the first sub-touch area SA1 and the second sub-touch area SA2 along the first direction (e.g., the X-axis direction). Accordingly, the proximity sensing electrodes PE may not be disposed at (e.g., in or on) a portion of each of the third sub-touch area SA3 and the fourth sub-touch area SA4. Although three proximity sensing electrodes PE are illustrated as being arranged along the first direction (e.g., the X-axis direction) in each of the first sub-touch area SA1 and the second sub-touch area SA2 in FIG. 6, the arrangement direction of the proximity sensing electrodes PE is not limited thereto, as long as the proximity sensing electrodes PE are arranged at (e.g., in or on) the second touch area TSA2.

In FIG. 6, each of the driving electrodes TE, the sensing electrodes RE, and the proximity sensing electrodes PE has a rhombic planar shape. However, the planar shape of each of the driving electrodes TE, the sensing electrodes RE, and the proximity sensing electrodes PE is not limited to the rhombic planar shape.

The driving electrodes TE, the sensing electrodes RE, and the proximity sensing electrodes PE may be electrically insulated from each other. The driving electrodes TE, the sensing electrodes RE, and the proximity sensing electrodes PE may be spaced apart from each other. The driving electrodes TE and the proximity sensing electrodes PE may be disposed side by side in the second direction (e.g., the Y-axis direction). The proximity sensing electrodes PE may be surrounded (e.g., around peripheries thereof) by the driving electrodes TE, respectively.

In order for the sensing electrodes RE and the driving electrodes TE to be electrically insulated from each other at their crossings (e.g., intersections), the sensing electrodes RE that are adjacent to each other in the first direction (e.g., the X-axis direction) may be connected to each other through second connection electrodes BE2. In addition, in order for the sensing electrodes RE and the proximity sensing electrodes PE to be electrically insulated from each other at their crossings (e.g., intersections), the proximity sensing electrodes PE that are adjacent to each other in the second direction (e.g., the Y-axis direction) may be connected to each other through a third connection portion BE3, and the driving electrodes TE that are adjacent to each other in the second direction (e.g., the Y-axis direction) may be connected to each other through a first connection portion BE1.

The driving electrodes TE and the sensing electrodes RE may be disposed at (e.g., in or on) both the second touch area TSA2 and the first touch area TSA1 of the touch area TSA. Therefore, in the first mode, first mutual capacitances may be formed between the driving electrodes TE and the sensing electrodes RE in the touch area TSA. On the other hand, the proximity sensing electrodes PE may be disposed only at (e.g., in or on) the first sub-touch area SA1 and the second sub-touch area SA2 of the second touch area TSA2. Therefore, in the second mode, second mutual capacitances may be formed between the driving electrodes TE and the proximity sensing electrodes PE in the first sub-touch area SA1 and the second sub-touch area SA2. Additionally, in the second mode, third mutual capacitances may be formed between the driving electrodes TE and the sensing electrodes RE in the third sub-touch area SA3 and the fourth sub-touch area SA4.

The conductive patterns DE may be electrically insulated from the driving electrodes TE and the sensing electrodes RE. The driving electrodes TE, the sensing electrodes RE, and the conductive patterns DE may be spaced apart from each other.

In the first touch area TSA1, the conductive patterns DE may be surrounded (e.g., around peripheries thereof) by the driving electrodes TE and the sensing electrodes RE, respectively. The conductive patterns DE disposed at (e.g., in or on) a portion of the second touch area TSA2 may be surrounded (e.g., around peripheries thereof) by the sensing electrodes RE, respectively. For example, in the first sub-touch area SA1 and the second sub-touch area SA2, the conductive patterns DE may be surrounded by the sensing electrodes RE, respectively. In addition, in the third sub-touch area SA3 and the fourth sub-touch area SA4, the conductive patterns DE may be surrounded (e.g., around peripheries thereof) by the sensing electrodes RE and the driving electrodes TE, respectively.

The conductive patterns DE may reduce parasitic capacitances between the second electrodes of the light emitting element layer EML and the driving electrodes TE or the sensing electrodes RE. The reduced parasitic capacitances may increase a charging rate at which the mutual capacitances between the driving electrodes TE and the sensing electrodes RE are charged. However, because the areas of the driving electrodes TE and the sensing electrodes RE are reduced due to the conductive patterns DE, the mutual capacitances between the driving electrodes TE and the sensing electrodes RE may be reduced, and thus, may be affected by noise. Therefore, the area of the conductive patterns DE may be appropriately determined (e.g., may be appropriately set) in consideration of the parasitic capacitances and the mutual capacitances.

The touch lines TL, RL, and PL may be disposed at (e.g., in or on) the non-touch area NTSA. The touch lines TL, RL, and PL may include sensing lines RL connected to the sensing electrodes RE, first driving lines TL1 and second driving lines TL2 connected to the driving electrodes TE, and proximity sensing lines PL connected to the proximity sensing electrodes PE.

The sensing electrodes RE disposed on a side of the touch area TSA may be connected to the sensing lines RL. For example, as illustrated in FIG. 6, the rightmost sensing electrodes RE from among the sensing electrodes RE electrically connected to each other in the first direction (e.g., the X-axis direction) may be connected to the sensing lines RL. The sensing lines RL may be connected to the second touch pads TP2. Therefore, the touch driving circuit 400 may be electrically connected to the sensing electrodes RE.

The driving electrodes TE disposed on a side of the touch area TSA may be connected to the first driving lines TL1, and the driving electrodes TE disposed on another side of the touch area TSA may be connected to the second driving lines TL2. For example, the lowermost driving electrodes TE from among the driving electrodes TE electrically connected to each other in the second direction (e.g., the Y-axis direction) may be connected to the first driving lines TL1. The uppermost driving electrodes TE may be connected to the second driving lines TL2. The second driving lines TL2 may be connected to the driving electrodes TE on the upper side of the touch area TSA via an area outside the left side of the touch area TSA. The first driving lines TL1 and the second driving lines TL2 may be connected to the first touch pads TP1. Therefore, the touch driving circuit 400 may be electrically connected to the driving electrodes TE.

The proximity sensing electrodes PE disposed at (e.g., in or on) the first sub-touch area SA1 and the second sub-touch area SA2 may be connected to the proximity sensing lines PL. For example, uppermost proximity sensing electrodes PE from among the proximity sensing electrodes PE electrically connected to each other in the second direction (e.g., the Y-axis direction) may be connected to the proximity sensing lines PL. The proximity sensing lines PL may be connected to the proximity sensing electrodes PE on the upper side of the touch area TSA via the area outside the left side of the touch area TSA. The proximity sensing lines PL may be connected to the first touch pads TP1. Therefore, the touch driving circuit 400 may be electrically connected to the proximity sensing electrodes PE.

In the first mode, the display device 10 may sense whether a person or an object has touched the touch sensing unit TDU, by sensing amounts of change in the first mutual capacitances between the driving electrodes TE and the sensing electrodes RE. In the second mode, the display device 10 may sense whether a person or an object is in proximity above the touch sensing unit TDU, by sensing amounts of change in the second mutual capacitances between the driving electrodes TE and the proximity sensing electrodes PE, and amounts of change in the third mutual capacitances between the driving electrodes TE and some of the sensing electrodes RE. In the proximity sensing, a person or an object may be detected, even when the person or the object is not in contact with the touch sensing unit TDU. Therefore, the magnitude of the mutual capacitance for the proximity sensing (e.g., sensing whether a person or an object is in proximity) may be larger than the magnitude of the mutual capacitance for sensing a touch of a person or an object. Because the magnitude of the second mutual capacitances may be proportional to the size of the driving electrodes TE and the size of the proximity sensing electrodes PE, the proximity sensing electrodes PE may be electrically connected to one proximity sensing line PL as illustrated in FIG. 6 in order to increase the magnitude of the second mutual capacitances.

According to an embodiment, as illustrated in FIG. 6, the driving electrodes TE and the sensing electrodes RE may be disposed at (e.g., in or on) both the second touch area TSA2 and the first touch area TSA1 of the touch area TSA, and the proximity sensing electrodes PE may be disposed only at (e.g., in or on) the first sub-touch area SA1 and the second sub-touch area SA2 of the second touch area TSA2 of the touch area TSA.

Therefore, in the first mode, because the first mutual capacitances may be formed between the driving electrodes TE and the sensing electrodes RE in the touch area TSA, touch sensing may be sufficiently performed. In addition, in the second mode, because the second mutual capacitances may be formed between the driving electrodes TE and the proximity sensing electrodes PE of the first sub-touch area SA1 and the second sub-touch area SA2, and the third mutual capacitances may be formed between the driving electrodes TE and the sensing electrodes RE of the third sub-touch area SA3 and the fourth sub-touch area SA4, proximity sensing may be sufficiently performed. However, the present disclosure is not limited thereto, and in some embodiments, a second light emitting electrode 173 (e.g., see FIG. 17) may also serve as the driving electrodes TE. For example, in the first mode, a contact touch may be sensed by sensing mutual capacitances between the driving electrodes TE and the sensing electrodes RE. In addition, in the second mode, a proximity touch may be sensed by sensing mutual capacitances between the second light emitting electrode 173 and the proximity sensing electrodes PE, and mutual capacitances between the second light emitting electrode 173 and the sensing electrodes RE.

Figure 8:
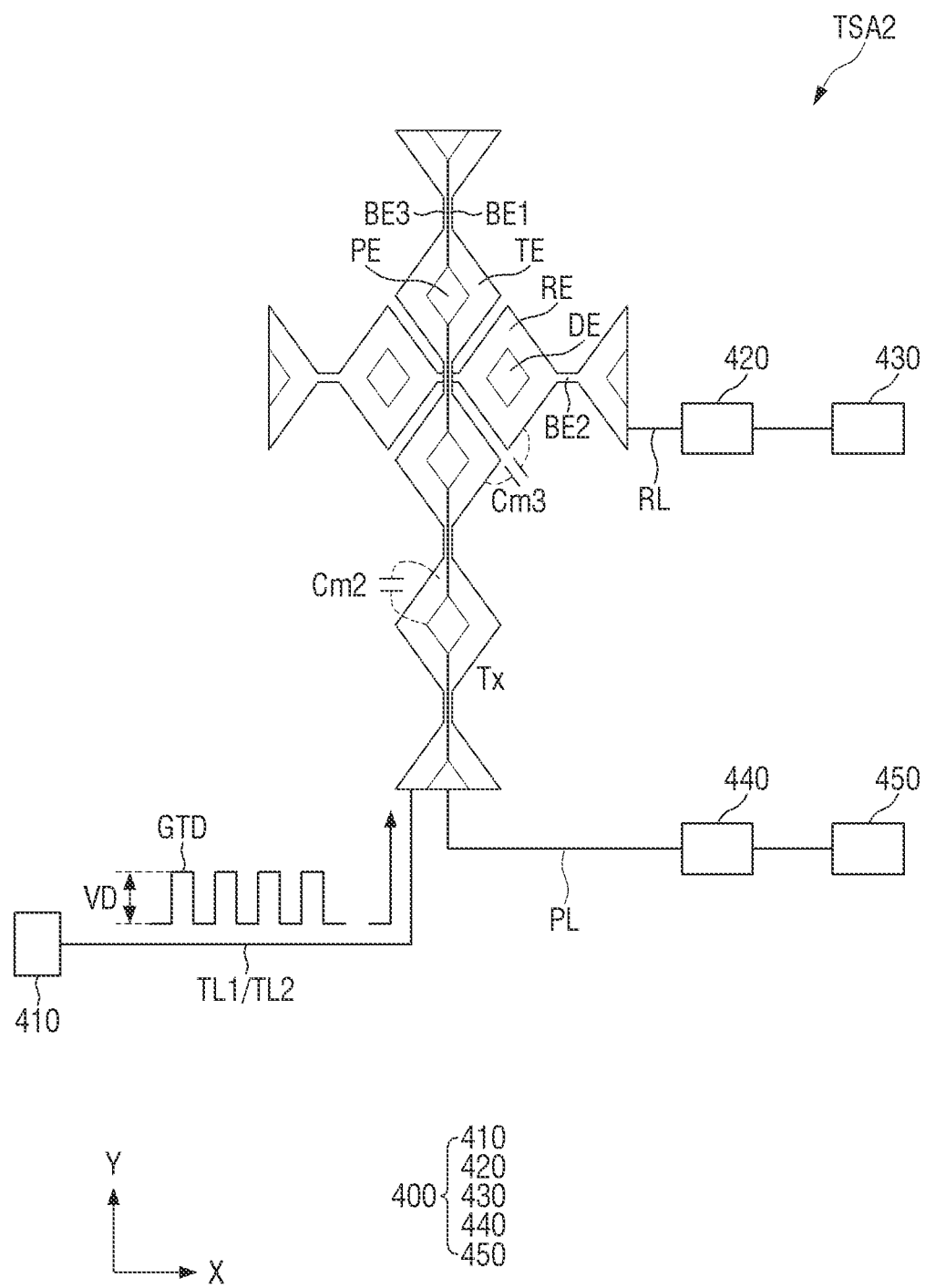
FIG. 8 illustrates a method of sensing amounts of change in second mutual capacitances and amounts of change in third mutual capacitances in a second touch area illustrated in FIG. 6.
Figure 9:
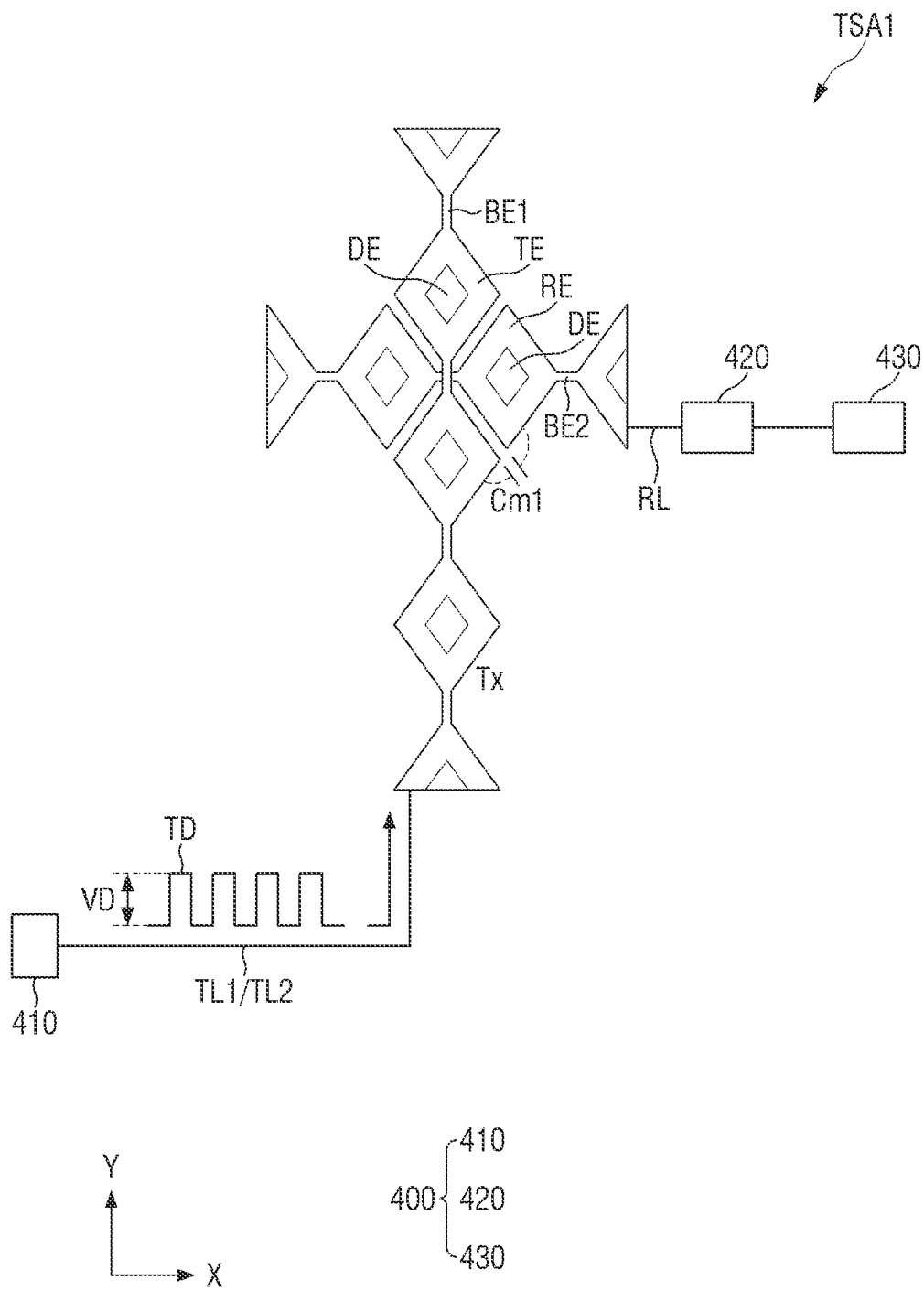
FIG. 9 illustrates a method of sensing amounts of change in first mutual capacitances in a first touch area illustrated in FIG. 6.

FIG. 8 illustrates a method of sensing amounts of change in the second mutual capacitances and amounts of change in the third mutual capacitances in the second touch area TSA2 illustrated in FIG. 6. FIG. 9 illustrates a method of sensing amounts of change in the first mutual capacitances in the first touch area TSA1 illustrated in FIG. 6.

In FIGS. 8 and 9, for convenience of illustration, one column of the driving electrodes TE that are electrically connected to each other in the second direction (e.g., the Y-axis direction), and one row of the sensing electrodes RE that are electrically connected to each other in the first direction (e.g., the X-axis direction) are illustrated.

Referring to FIGS. 8 and 9, in the second touch area TSA2, third mutual capacitances Cm3 may be formed between the driving electrodes TE and the sensing electrodes RE, and second mutual capacitances Cm2 may be formed between the driving electrodes TE and the proximity sensing electrodes PE. In the first touch area TSA1, first mutual capacitances Cm1 may be formed between the driving electrodes TE and the sensing electrodes RE.

The touch driving circuit 400 may include a touch driving signal output unit (e.g., a touch driving signal output circuit) 410, a first touch sensing unit (e.g., a first touch sensing circuit) 420, a first analog-to-digital converter 430, a second touch sensing unit (e.g., a second touch sensing circuit) 440, and a second analog-to-digital converter 450.

The touch driving signal output unit 410 may output a touch driving signal TD to the driving electrodes TE through the first driving lines TL1, and may output the touch driving signal TD to the driving electrodes TE through the second driving lines TL2. The touch driving signal TD may include a plurality of pulses.

The touch driving signal output unit 410 may output the touch driving signal TD to the driving lines TL1 and TL2 in a suitable order (e.g., a predetermined order). For example, the touch driving signal output unit 410 may output the touch driving signal TD to the driving electrodes TE sequentially from the driving electrodes TE disposed on the left side of the touch sensor area TSA to the driving electrodes TE disposed on the right side of the touch sensor area TSA (e.g., see FIG. 6).

The first touch sensing unit 420 senses voltages charged in the first mutual capacitances Cm1 or the third mutual capacitances Cm3 through the sensing lines RL electrically connected to the sensing electrodes RE. The first touch sensing unit 420 may include an operational amplifier, a feedback capacitor, and a reset switch.

The first analog-to-digital converter 430 may receive the voltages charged in the mutual capacitances sensed by the first touch sensing unit 420. The first analog-to-digital converter 430 may convert the voltages charged in the mutual capacitances into first digital data, and may output the first digital data.

The second touch sensing unit 440 senses voltages charged in the second mutual capacitances Cm2 through the proximity sensing lines PL connected to the proximity sensing electrodes PE. The second touch sensing unit 440 may include an operational amplifier, a feedback capacitor, and a reset switch.

The second analog-to-digital converter 450 may receive the voltages charged in the mutual capacitances sensed by the second touch sensing unit 440. The second analog-to-digital converter 450 may convert the voltages charged in the mutual capacitances into second digital data, and may output the second digital data.

The touch driving circuit 400 may be driven in the first mode (e.g., a touch sensing mode) and the second mode (e.g., a proximity sensing mode). In the touch sensing mode, the touch driving circuit 400 may be driven to sense amounts of change in the first mutual capacitances Cm1 of the second touch area TSA2 and the first touch area TSA1. In addition, in the proximity sensing mode (e.g., the second mode), the touch driving circuit 400 may be driven to sense amounts of change in the third mutual capacitances Cm3 of the third sub-touch area SA3 and the fourth sub-touch area SA4, and amounts of change in the second mutual capacitances Cm2 of the first sub-touch area SA1 and the second sub-touch area SA2.

For example, the touch driving signal output unit 410 may output the touch driving signal TD to the driving electrodes TE through the driving lines TL1 and TL2 in the touch sensing mode. In the touch sensing mode, the first touch sensing unit 420 senses voltages charged in the first mutual capacitances Cm1 through the sensing lines RL electrically connected to the sensing electrodes RE of the touch area TSA. In the touch sensing mode, the first analog-to-digital converter 430 may convert output voltages of the first touch sensing unit 420 into first digital data, and may output the first digital data.

The touch driving circuit 400 may calculate touch coordinates by analyzing the first digital data in the touch sensing mode. For example, the touch driving circuit 400 may calculate the first digital data equal to or greater than a first threshold value as first touch data, and may calculate coordinates of a first mutual capacitance Cm1 corresponding to the first touch data as touch coordinates.

In addition, the touch driving signal output unit 410 may output the touch driving signal TD (e.g., as a proximity touch driving signal GTD) to the driving electrodes TE through the driving lines TL1 and TL2 in the proximity sensing mode. In the proximity sensing mode, the first touch sensing unit 420 may sense voltages charged in the third mutual capacitances Cm3 through the sensing lines RL electrically connected to the sensing electrodes RE of the third sub-touch area SA3. In the proximity sensing mode, the first analog-to-digital converter 430 may convert output voltages of the first touch sensing unit 420 into third digital data, and may output the third digital data. In addition, in the proximity sensing mode, the first touch sensing unit 420 may also sense voltages charged in mutual capacitances through the sensing lines RL electrically connected to the sensing electrodes RE of the fourth sub-touch area SA4. In the proximity sensing mode, the first analog-to-digital converter 430 may convert output voltages of the first touch sensing unit 420 into digital data, and may output the digital data.

In addition, in the proximity sensing mode, the second touch sensing unit 440 may sense voltages charged in the second mutual capacitances Cm2 through the proximity sensing lines PL electrically connected to the proximity sensing electrodes PE of the first sub-touch area SA1. In the proximity sensing mode, the second analog-to-digital converter 450 may convert output voltages of the second touch sensing unit 440 into second digital data, and may output the second digital data. In addition, in the proximity sensing mode, the second touch sensing unit 440 may sense voltages charged in mutual capacitance through the proximity sensing lines PL electrically connected to the proximity sensing electrodes PE of the second sub-touch area SA2. In the proximity sensing mode, the second analog-to-digital converter 450 may convert output voltages of the second touch sensing unit 440 into digital data, and may output the digital data.

The touch driving circuit 400 may determine whether a person or an object is in proximity by analyzing the second digital data and the third digital data in the proximity sensing mode. For example, when the sum of the second digital data and the third digital data is equal to or greater than a second threshold value in the proximity sensing mode, the touch driving circuit 400 may determine that a person or an object is in proximity. As another example, in the proximity sensing mode, the touch driving circuit 400 may calculate distances from the first sub-touch area SA1 and the third sub-touch area SA3 according to the second digital data and the third digital data. In addition, the touch driving circuit 400 may calculate distances between the second sub-touch area SA2 and the fourth sub-touch area SA4 based on a plurality of pieces of digital data. Accordingly, the touch driving circuit 400 may determine whether the person or the object has moved by continuously receiving digital data.

In the proximity sensing, a person or object may be detected, even when the person or object is not in contact with the touch sensing unit TDU. Therefore, the magnitude of the mutual capacitance for sensing whether a person or an object is in proximity may be larger than the magnitude of the mutual capacitance for sensing a touch of a person or an object. Thus, a voltage difference VD between a high voltage and a low voltage of the touch driving signal TD (e.g., the proximity touch driving signal GTD) transmitted in the proximity sensing mode may be greater than a voltage difference VD between a high voltage and a low voltage of the touch driving signal TD transmitted in the touch sensing mode.

According to one or more embodiments described above with reference to FIGS. 8 and 9, the touch sensing unit TDU may determine whether a person or an object is in proximity by sensing the amounts of change in the second mutual capacitances Cm2 and the amounts of change in the third mutual capacitances Cm3 in the second touch area TSA2. Therefore, the display device 10 may suitably sense whether or not a person or an object is in proximity, without a separate proximity sensor.

Figure 10:
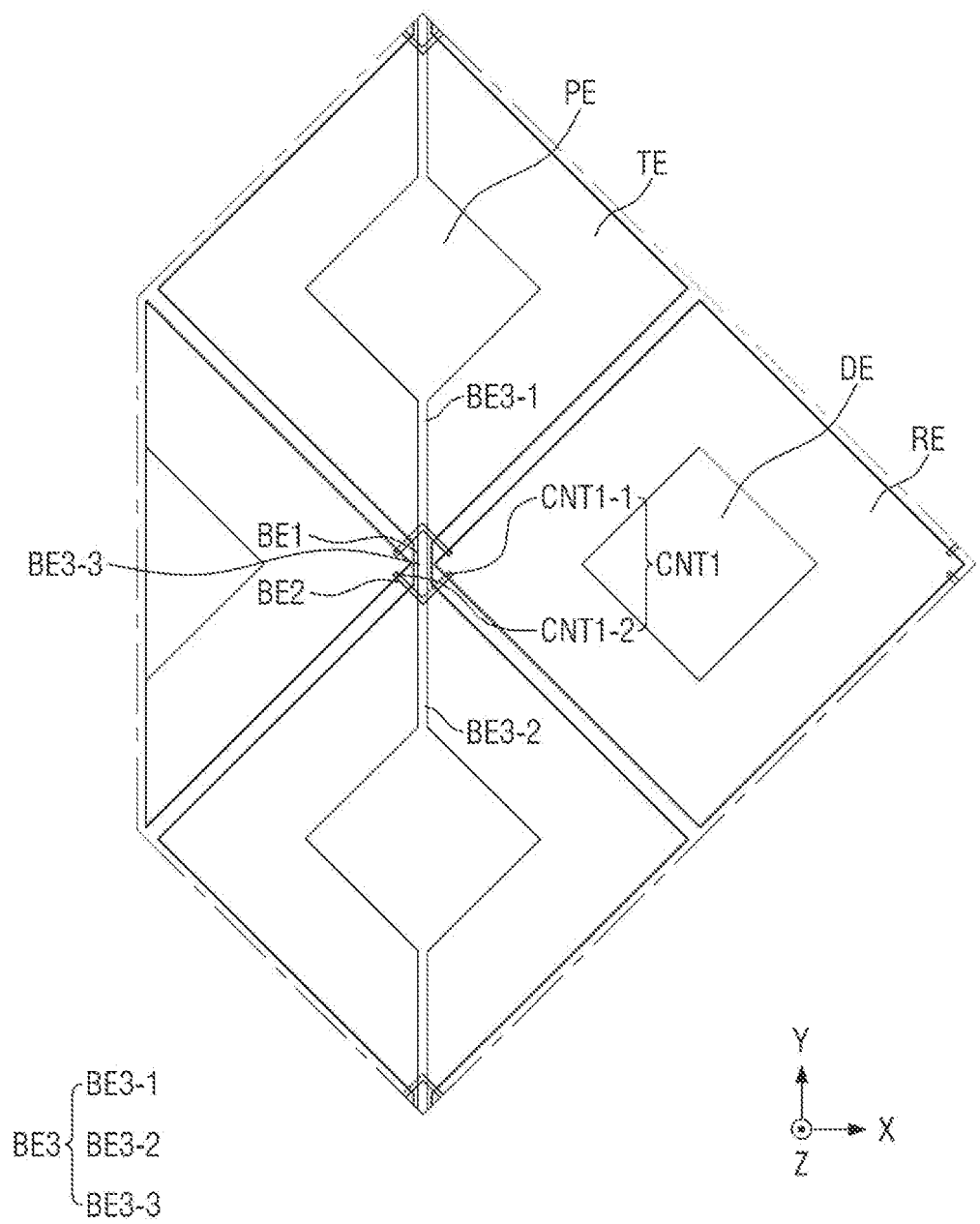
FIG. 10 is an enlarged plan view of the area A of FIG. 6.

FIG. 10 is an enlarged plan view of the area A of FIG. 6.

Referring to FIG. 10, the sensing electrodes RE may be disposed along the first direction (e.g., the X-axis direction), and may be electrically connected to each other. The driving electrodes TE may be disposed along the second direction (e.g., the Y-axis direction), and may be electrically connected to each other. The proximity sensing electrodes PE may be disposed along the second direction (e.g., the Y-axis direction), and may be electrically connected to each other.

The driving electrodes TE, the sensing electrodes RE, the proximity sensing electrodes PE, and the conductive patterns DE may be electrically insulated from each other. The driving electrodes TE, the sensing electrodes RE, the proximity sensing electrodes PE, and the conductive patterns DE may be spaced apart from each other. The driving electrodes TE and the proximity sensing electrodes PE may be disposed side by side with each other in the second direction (e.g., the Y-axis direction). The proximity sensing electrodes PE may be surrounded (e.g., around peripheries thereof) by the driving electrodes TE, respectively. The conductive patterns DE may be surrounded (e.g., around peripheries thereof) by the sensing electrodes RE, respectively.

As illustrated in FIG. 10, the size of each of the driving electrodes TE and the size of each of the sensing electrodes RE may be the same or substantially the same as each other. The size of each of the proximity sensing electrodes PE and the size of each of the conductive patterns DE may be the same or substantially the same as each other. The size of each of the driving electrodes TE may be greater than the size of each of the proximity sensing electrodes PE. The size of each of the driving electrodes TE may be greater than the size of each of the conductive patterns DE. The size of each of the sensing electrodes RE may be greater than the size of each of the proximity sensing electrodes PE. The size of each of the sensing electrodes RE may be greater than the size of each of the conductive patterns DE. Although each of the driving electrodes TE, the sensing electrodes RE, the proximity sensing electrodes PE, and the conductive patterns DE are illustrated as having a rhombic planar shape in FIG. 10, the planar shape of each of the driving electrodes TE, the sensing electrodes RE, the proximity sensing electrodes PE, and the conductive patterns DE is not limited thereto.

The first connection portion BE1 may be formed at (e.g., in or on) the same layer as that of the driving electrodes TE, and may extend from the driving electrodes TE. The driving electrodes TE and the first connection portion BE1 may include (e.g., may be made of) the same material as each other.

The sensing electrodes RE adjacent to each other in the first direction (e.g., the X-axis direction) may be connected to each other through the second connection electrodes BE2, so that the sensing electrodes RE and the driving electrodes TE are electrically insulated from each other at their crossings.

The second connection electrodes BE2 may be formed at (e.g., in or on) a different layer from that of the sensing electrodes RE, and may be connected to the sensing electrodes RE through first contact holes CNT1. For example, the second connection electrodes BE2 may be formed on the thin-film encapsulation layer TFEL illustrated in FIG. 17, and the sensing electrodes RE may be formed on a first insulating layer TINS1 illustrated in FIG. 17. The first insulating layer TINS1 may be disposed on the thin-film encapsulation layer TFEL.

The second connection electrodes BE2 may be bent at least once. Although the second connection electrodes BE2 are illustrated as being bent in the shape of "<" or ">" in FIG. 10, the shape of each of the second connection electrodes BE2 is not limited thereto. In addition, because the sensing electrodes RE that are adjacent to each other in the first direction (e.g., the X-axis direction) are connected to each other by a plurality of second connection electrodes BE2, even if any one of the second connection electrodes BE2 is broken, the sensing electrodes RE that are adjacent to each other in the first direction (e.g., the X-axis direction) may be stably connected to each other. Although the sensing electrodes RE that are adjacent to each other are illustrated as being connected to each other by two second connection electrodes BE2 in FIG. 10, the number of the second connection electrodes BE2 is not limited thereto.

The third connection portion BE3 may include a $(3\text{-}1)^{th}$ connection portion BE3-1, a $(3\text{-}2)^{th}$ connection portion BE3-2, and a $(3\text{-}3)^{th}$ connection portion BE3-3. Each of the $(3\text{-}1)^{th}$ connection portion BE3-1 and the $(3\text{-}2)^{th}$ connection portion BE3-2 may be electrically insulated from a driving electrode TE. Each of the $(3\text{-}1)^{th}$ connection portion BE3-1 and the $(3\text{-}2)^{th}$ connection portion BE3-2 may be spaced apart from the driving electrode TE.

The $(3\text{-}1)^{th}$ connection portion BE3-1 may be connected to a proximity sensing electrode PE surrounded (e.g., around a periphery thereof) by one of the driving electrodes TE that are adjacent to each other in the second direction (e.g., the Y-axis direction). The $(3\text{-}2)^{th}$ connection portion BE3-2 may be connected to a proximity sensing electrode PE surrounded by the other one of the driving electrodes TE that are adjacent to each other in the second direction (e.g., the Y-axis direction).

The $(3\text{-}3)^{th}$ connection portion BE3-3 may be connected to each of the $(3\text{-}1)^{th}$ connection portion BE3-1 and the $(3\text{-}2)^{th}$ connection portion BE3-2. The $(3\text{-}3)^{th}$ connection portion BE3-3 may be formed at (e.g., in or on) the same layer as that of the $(3\text{-}1)^{th}$ connection portion BE3-1 and the $(3\text{-}2)^{th}$ connection portion BE3-2, and may be connected to the $(3\text{-}1)^{th}$ connection portion BE3-1 and the $(3\text{-}2)^{th}$ connection portion BE3-2.

According to an embodiment, as illustrated in FIG. 10, the first connection portions BE1 connecting the driving electrodes TE that are adjacent to each other in the second direction (e.g., the Y-axis direction), the driving electrodes TE, the sensing electrodes RE, the proximity sensing electrodes PE, and the $(3\text{-}1)^{th}$ through $(3\text{-}3)^{th}$ connection portions BE3-1 through BE3-3 electrically connecting the proximity sensing electrodes PE that are adjacent to each other in the second direction (e.g., the Y-axis direction) may be formed at (e.g., in or on) a different layer from that of the second connection electrodes BE2. Therefore, the driving electrodes TE, the sensing electrodes RE, and the proximity sensing electrodes PE may be electrically insulated from each other at their crossings, the sensing electrodes RE may be electrically connected to each other in the first direction (e.g., the X-axis direction), and the driving electrodes TE may be electrically connected to each other in the second direction (e.g., the Y-axis direction), and the proximity sensing electrodes PE may be electrically connected to each other in the second direction (e.g., the Y-axis direction).

Figure 11:
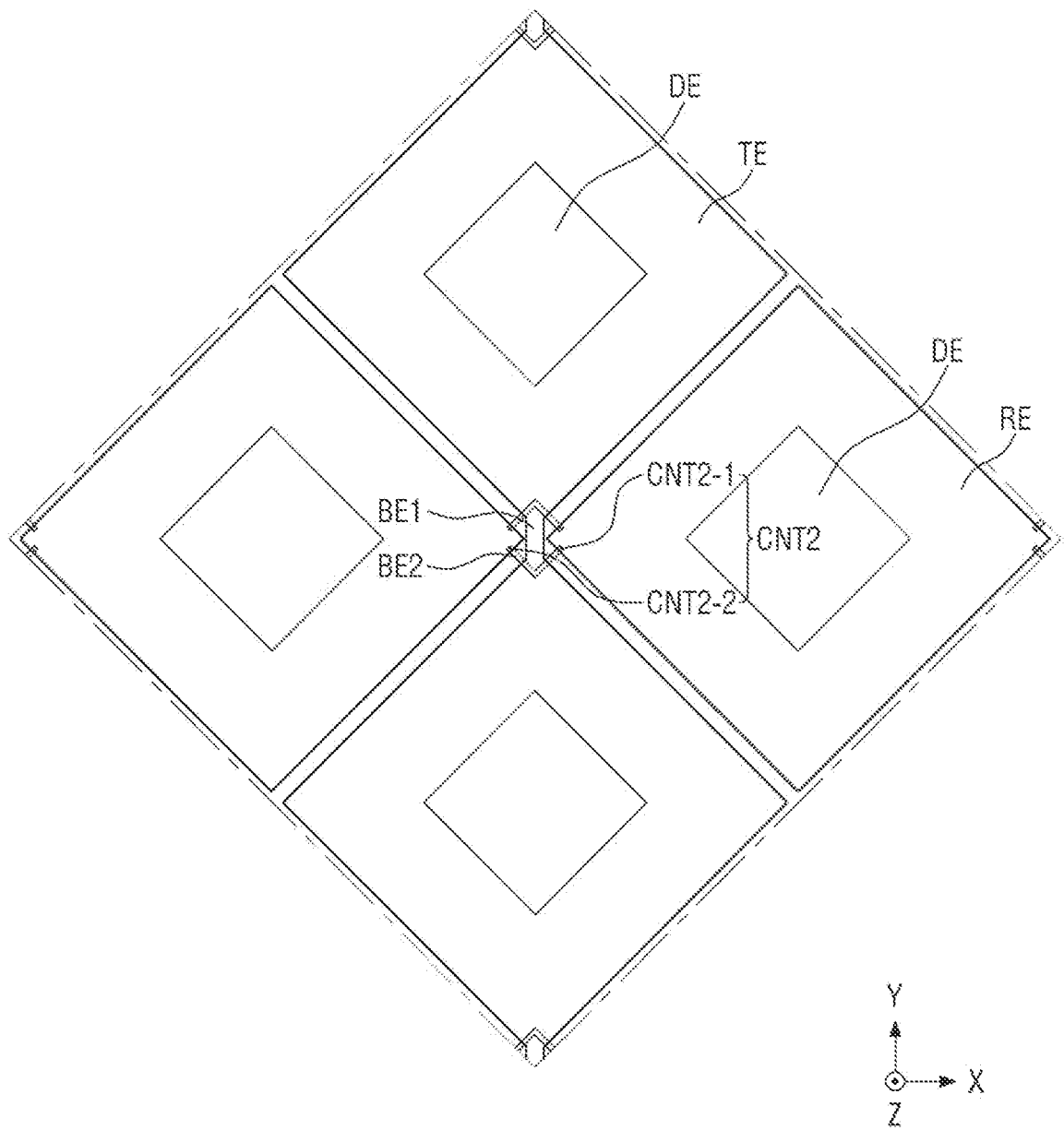
FIG. 11 is an enlarged plan view of the area B of FIG. 6.

FIG. 11 is an enlarged plan view of the area B of FIG. 6.

Referring to FIG. 11, the first touch area TSA1 may have a different structure from those of the first sub-touch area SA1 and the second sub-touch area SA2 of the second touch area TSA2, in that the proximity sensing electrodes PE are replaced with the conductive patterns DE, and that the third connection portion BE3 for electrically connecting the proximity sensing electrodes PE that are adjacent to each other in second direction (e.g., the Y-axis direction) is omitted. The driving electrodes TE, the sensing electrodes RE, the conductive patterns DE, the first connection portions BE1, and the second connection electrodes BE2 illustrated in FIG. 11 may be the same or substantially the same as those described above with reference to FIG. 10, and thus, redundant description thereof are not be repeated.

Figure 12:
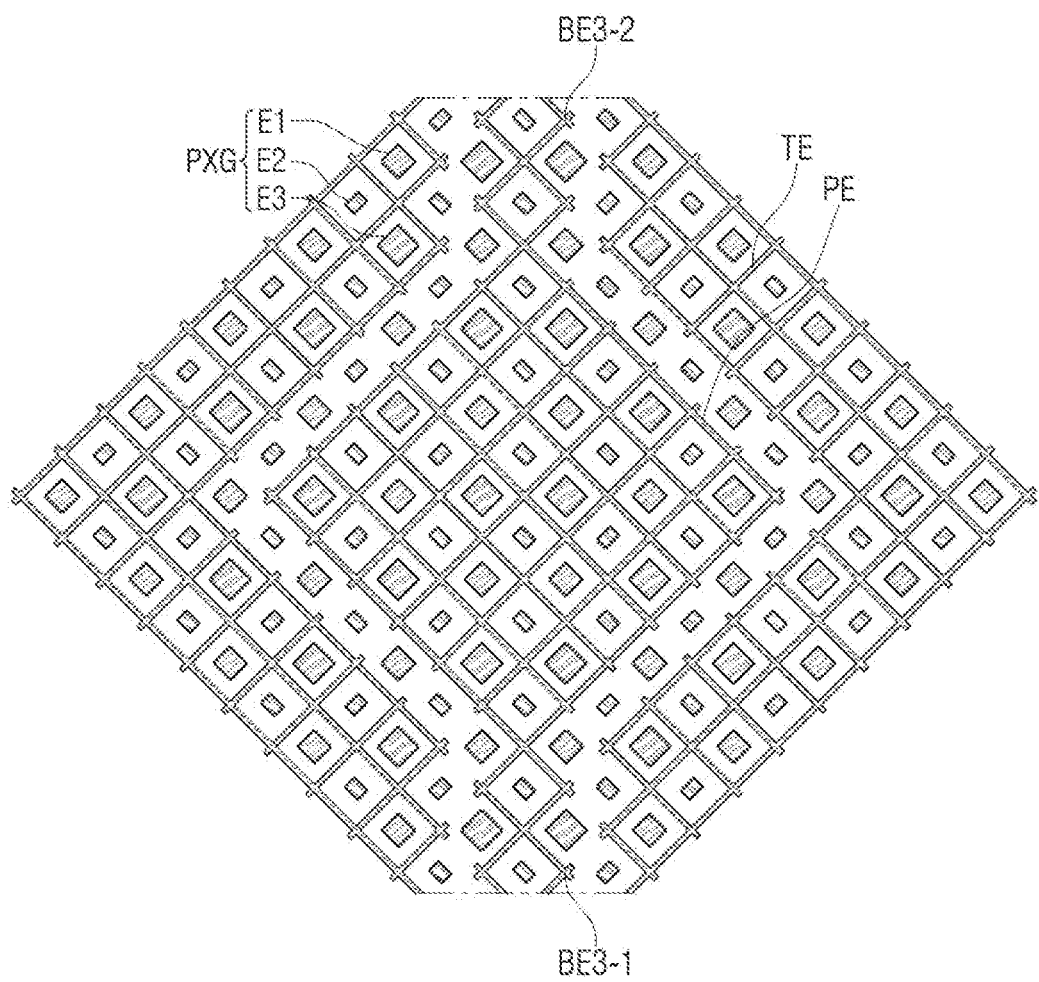
FIGS. 12 and 13 are plan views illustrating pixels and sensor electrodes according to one or more embodiments.
Figure 13:
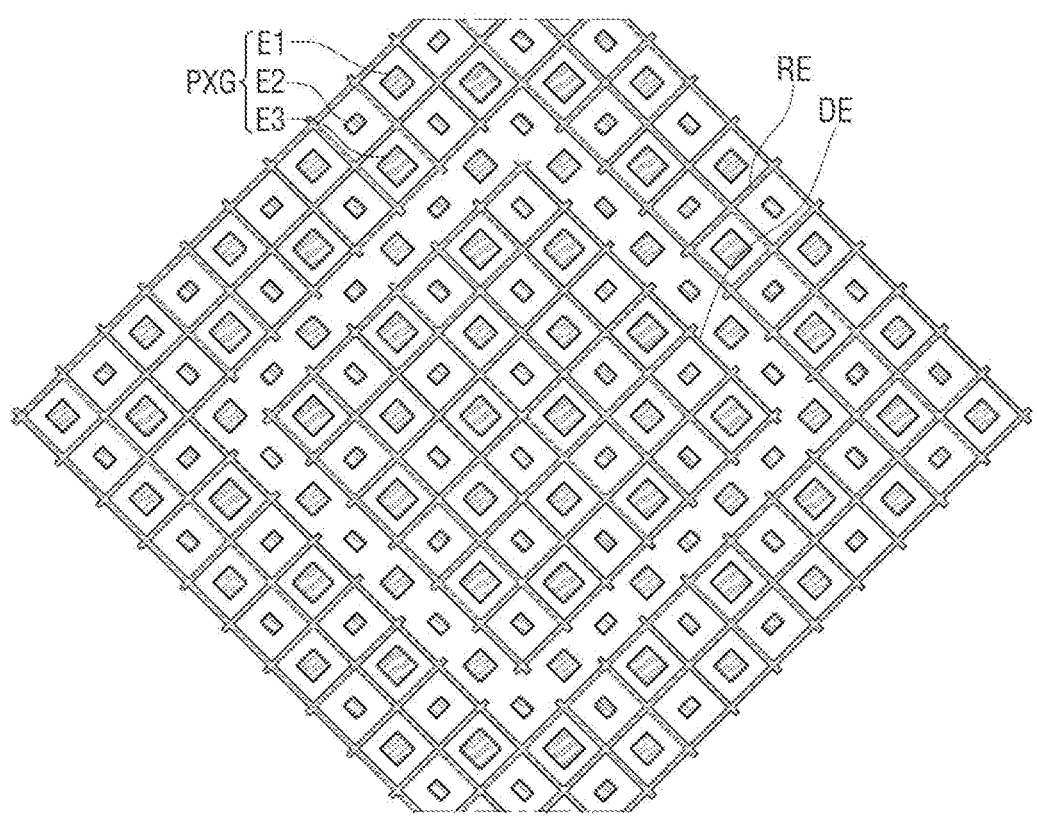

FIGS. 12 and 13 are plan views illustrating pixels and sensor electrodes according to one or more embodiments.

Referring to FIGS. 12 and 13, the driving electrodes TE, the sensing electrodes RE, the first connection portions BE1, the second connection electrodes BE2, the $(3-1)^{th}$ connection portions BE3-1, the $(3-2)^{th}$ connection portions BE3-2, and the $(3-3)^{th}$ connection portions BE3-3 may be formed in a mesh shape or a net shape. The proximity sensing electrodes PE and the conductive patterns DE may also be formed in a mesh shape or a net shape. When the touch sensing layer TSL including the driving electrodes TE, the sensing electrodes RE, and the proximity sensing electrodes PE is directly formed on the thin-film encapsulation film TFEL as illustrated in FIG. 4, the second electrode of the light emitting element layer EML may be located close to each of the driving electrodes TE, the sensing electrodes RE, and the proximity sensing electrodes PE of the touch layer (e.g., the touch sensing layer TSL). Therefore, a large parasitic capacitance may be formed between the second electrode of the light emitting element layer EML and each of the driving electrodes TE, the sensing electrodes RE, and the proximity sensing electrodes PE of the touch layer. Because the parasitic capacitance may be proportional to an overlap area between the second electrode of the light emitting element layer EML and each of the driving electrodes TE, the sensing electrodes RE, and the proximity sensing electrodes PE of the touch layer, each of the driving electrodes TE, the sensing electrodes RE, and the proximity sensing electrodes PE may be formed in a mesh shape or a net shape in order to reduce the parasitic capacitance.

Subpixels E1 through E3 may include first subpixels E1 for emitting light of a first color, second subpixels E2 for emitting light of a second color, and third subpixels E3 for emitting light of a third color. In FIGS. 12 and 13, the first subpixels E1 are red subpixels, the second subpixels E2 are green subpixels, and the third subpixels E3 are blue subpixels, but the present disclosure is not limited thereto. In FIGS. 12 and 13, the first subpixels E1, the second subpixels E2, and the third subpixels E3 have a hexagonal planar shape. However, the present disclosure is not limited thereto, and the first subpixels E1, the second subpixels E2, and the third subpixels E3 may have a polygonal shape other than a hexagon, a circular shape, or an oval shape in a plan view. In addition, the size of the first subpixels E1, the size of the second subpixels E2, and the size of the third subpixels E3 may be the same or substantially the same as each other, or may be different from each other as illustrated in FIGS. 12 and 13. For example, the size of the third subpixels E3 may be the largest, and the size of the second subpixels E2 may be the smallest. As another example, the size of the first subpixels E1 and the size of the third subpixels E3 may be the same or substantially the same as each other, and the size of the second subpixels E2 may be smaller than the size of the first subpixels E1 and the size of the third subpixels E3.

A pixel PXG refers to a group of subpixels that may express a gray level. Although each pixel PXG is illustrated as including one first subpixel E1, two second subpixels E2, and one third subpixel E3 in FIGS. 13 and 14, the present disclosure is not limited thereto. For example, each pixel PXG may include one first subpixel E1, one second subpixel E2, and one third subpixel E3.

Because the driving electrodes TE, the sensing electrodes RE, the proximity sensing electrodes PE, the conductive patterns DE, the first connection portions BE1, the second connection electrodes BE2, the $(3-1)^{th}$ connection portions BE3-1, the $(3-2)^{th}$ connection portions BE3-2, and the $(3-3)^{th}$ connection portions BE3-3 are formed in a mesh shape or a net shape, the subpixels E1 through E3 may not overlap with the driving electrodes TE, the sensing electrodes RE, the proximity sensing electrodes PE, the conductive patterns DE, the first connection portions BE1, the second connection electrodes BE2, the $(3-1)^{th}$ connection portions BE3-1, the $(3-2)^{th}$ connection portions BE3-2, and the $(3-3)^{th}$ connection portions BE3-3. Therefore, light output from the subpixels E1 through E3 may not be blocked by the driving electrodes TE, the sensing electrodes RE, the proximity sensing electrodes PE, the conductive patterns DE, the first connection portions BE1, the second connection electrodes BE2, the $(3-1)^{th}$ connection portions BE3-1, the $(3-2)^{th}$ connection portions BE3-2, and the $(3-3)^{th}$ connection portions BE3-3. Accordingly, a reduction in the luminance of the light may be prevented or substantially prevented.

Figure 14:
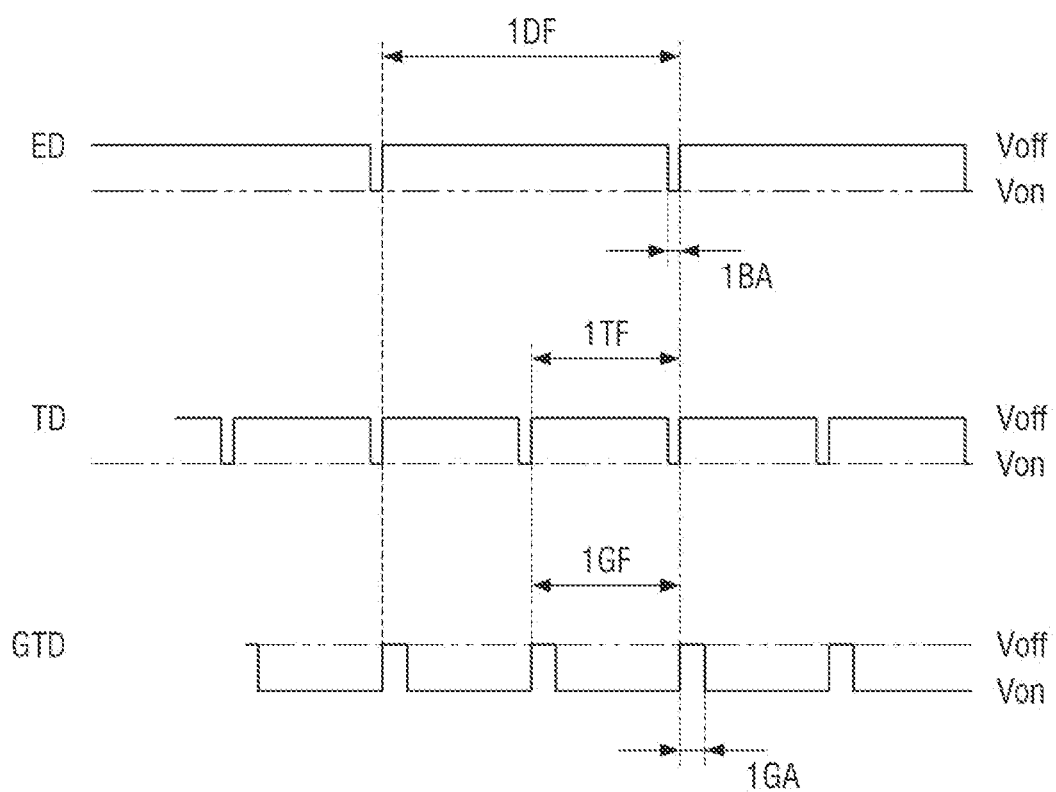
FIGS. 14-16 are timing diagrams illustrating a method of driving the display device according to one or more embodiments.
Figure 15:
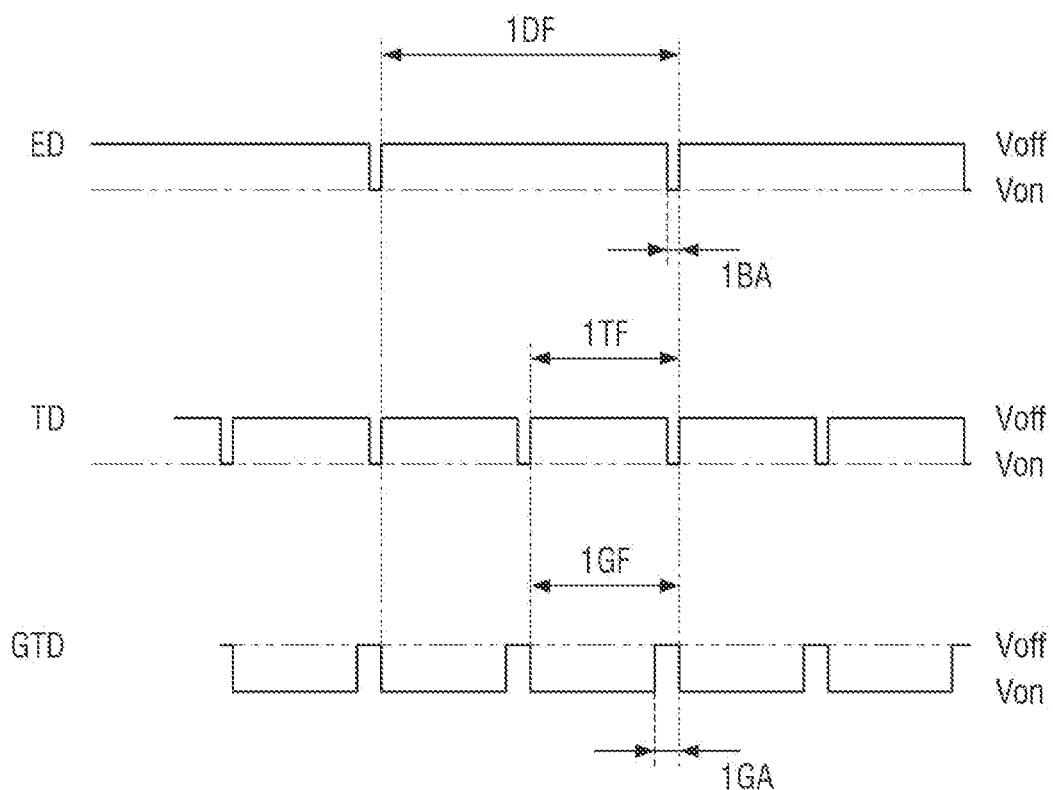
Figure 16:
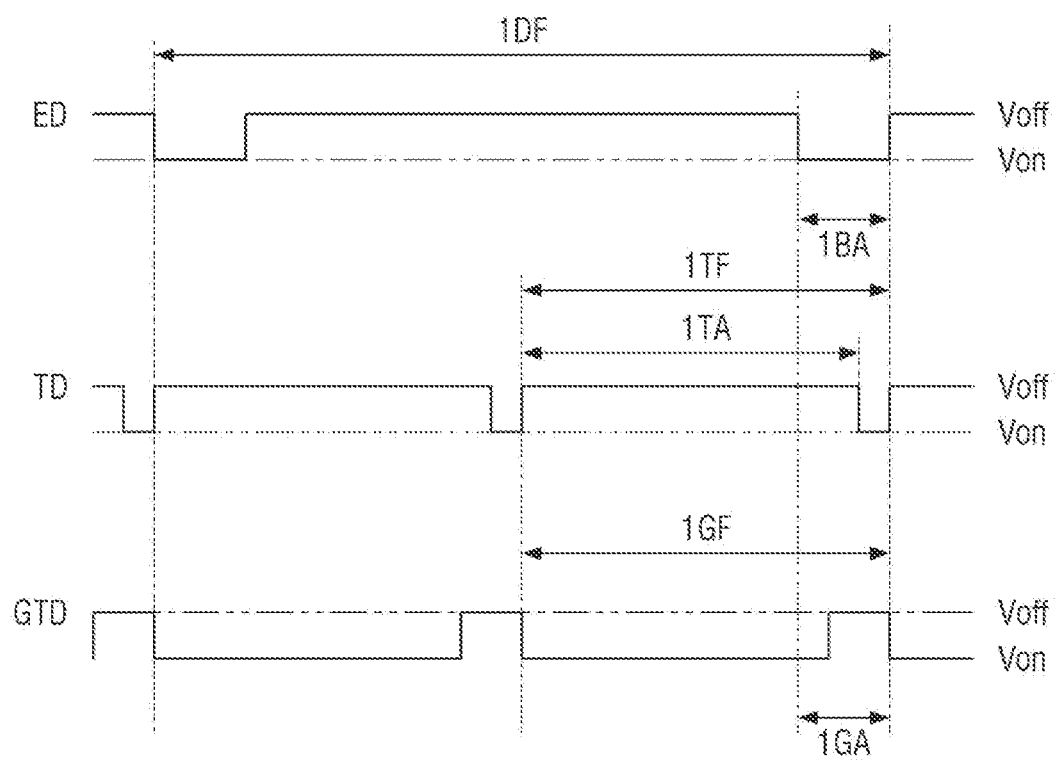

FIGS. 14 through 16 are timing diagrams illustrating a method of driving the display device 10 according to one or more embodiments.

Referring to FIGS. 14 through 16, the display driving circuit 200 may output an emission signal ED to the display unit DU. The emission signal ED may have an emission frame frequency 1DF. The pixels PXG may receive the emission signal ED, and may emit light according to the emission frame frequency 1DF of the emission signal ED. The emission frame frequency 1DF of the emission signal ED may be 60 Hz or 120 Hz. However, the present disclosure is not limited thereto, and the emission signal ED may have other suitable frequencies.

The touch driving circuit 400 may output a touch driving signal TD to the touch sensing unit TDU in the first mode, and may output a proximity touch driving signal GTD to the touch sensing unit TDU in the second mode. The touch driving signal TD may have a touch driving frequency 1TF. The touch sensing unit TDU may receive the touch driving signal TD in the first mode, and may sense a contact touch according to the touch driving frequency 1TF. The proximity touch driving signal GTD may have a proximity touch driving frequency 1GF. The touch sensing unit TDU may receive the proximity touch driving signal GTD in the second mode, and may sense a proximity touch according to the proximity touch driving frequency 1GF.

The touch driving frequency 1TF may be the same or substantially the same as the proximity touch driving frequency 1GF. In addition, the touch driving signal TD and the proximity touch driving signal GTD may alternate with each other. For example, as illustrated in the embodiment of FIG. 14, after the proximity touch driving signal GTD is transmitted to the touch sensing unit TDU in one frame, the touch driving signal TD may be transmitted. In other words, in any one frame, the touch sensing unit TDU may operate in the second mode in which the proximity touch driving signal GTD is transmitted, and then may operate in the first mode in which the touch driving signal TD is transmitted. As another example, as illustrated in the embodiment of FIG. 15, after the touch driving signal TD is transmitted to the touch sensing unit TDU in one frame, the proximity touch driving signal GTD may be transmitted. In other words, in any one frame, the touch sensing unit TDU may operate in the first mode in which the touch driving signal TD is transmitted, and then may operate in the second mode in which the proximity touch driving signal GTD is transmitted.

Referring to FIG. 16, a first sensing period 1GA, in which the touch sensing unit TDU performs sensing according to the proximity touch driving signal GTD, may be shorter than a second sensing period 1TA, in which the touch sensing unit TDU performs sensing according to the touch driving signal TD. In other words, the second sensing period 1TA for sensing a contact touch in the first mode may be longer than the first sensing period 1GA for sensing a proximity touch in the second mode. In addition, the first sensing period 1GA may be shorter than a third period 1BA during which no light is emitted in response to the emission signal ED. If the proximity touch driving signal GTD is transmitted during a period in which the pixels PXG emit light according to the emission signal ED, parasitic capacitances may be formed between the pixels PXG and the sensor electrodes TE, RE, and PE. Therefore, in order to reduce the parasitic capacitances, the first sensing period 1GA may be shorter than the third period 1BA during which the pixels PXG do not emit light.

Figure 17:
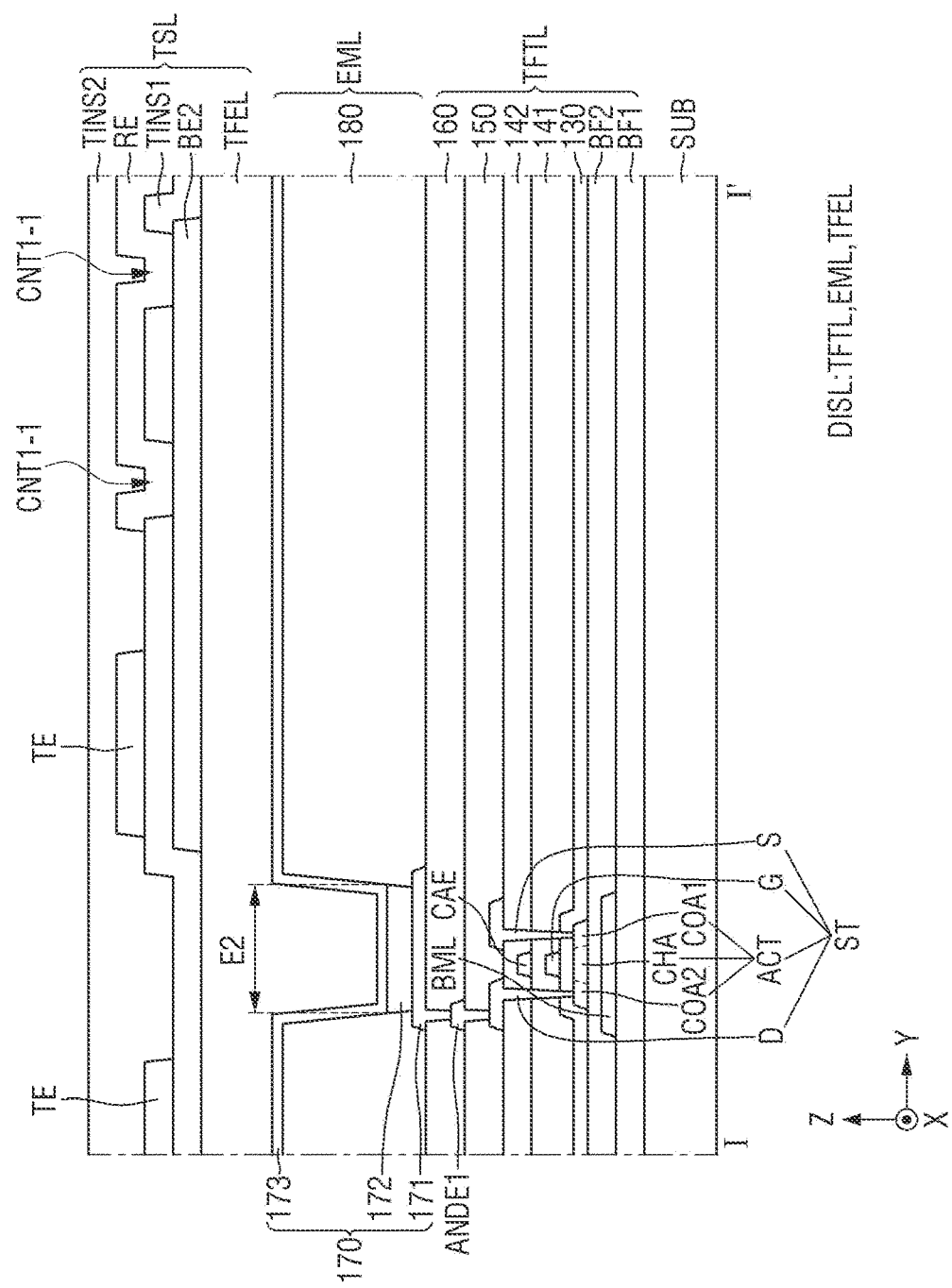
FIG. 17 is a cross-sectional view of the display device according to an embodiment.

FIG. 17 is a cross-sectional view of the display device 10 according to an embodiment.

Referring to FIG. 17, a display layer DISL including the thin-film transistor layer TFTL, the light emitting element layer EML, and the thin-film encapsulation layer TFEL may be disposed on the substrate SUB. The touch layer including the sensor electrodes TE, RE, and PE may be disposed on the display layer DISL.

A first buffer layer BF1 may be disposed on a surface of the substrate SUB, and a second buffer layer BF2 may be disposed on the first buffer layer BF1. The first and second buffer layers BF1 and BF2 may be formed on the surface of the substrate SUB to protect the thin-film transistors of the thin-film transistor layer TFTL and a light emitting layer 172 of the light emitting element layer EML from moisture that may be introduced through the substrate SUB, which may be vulnerable to moisture penetration. Each of the first and second buffer layers BF1 and BF2 may include (e.g., may be composed of) a plurality of inorganic layers that are stacked alternately. At least any one of the first or second buffer layers BF1 or BF2 may be omitted as needed or desired.

A first light blocking layer BML may be disposed on the first buffer layer BF1. The first light blocking layer BML may be a single layer or multilayers including (e.g., made of) any one or more of molybdenum (Mo), aluminum (Al), chromium (Cr), gold (Au), titanium (Ti), nickel (Ni), neodymium (Ne), copper (Cu), and suitable alloys thereof.

An active layer ACT of a thin-film transistor ST may be disposed on the second buffer layer BF2. The active layer ACT may overlap with the first light blocking layer BML in the third direction (e.g., the Z-axis direction). Light incident through the substrate SUB may be blocked by the first light blocking layer BML. Therefore, it may be possible to prevent or substantially prevent leakage current from flowing into the active layer ACT due to the light incident through the substrate SUB.

The thin-film transistor ST includes a plurality of electrode layers G, S, D, and ANDE1, and a plurality of insulating layers 130, 141 and 142. A gate insulating layer 130 may be formed on the active layer ACT of the thin-film transistor ST, and a gate electrode G of the thin-film transistor ST may be disposed on the gate insulating layer 130. The gate electrode G of the thin-film transistor ST may overlap with the active layer ACT in the third direction (e.g., the Z-axis direction).

A first interlayer insulating layer 141 may be disposed on the gate electrode G, and a capacitor electrode CAE may be disposed on the first interlayer insulating layer 141. The capacitor electrode CAE may overlap with the gate electrode G in the third direction (e.g., the Z-axis direction).

A second interlayer insulating layer 142 may be disposed on the capacitor electrode CAE, and a first electrode S and a second electrode D of the thin-film transistor ST may be disposed on the second interlayer insulating layer 142.

The first electrode S of the thin-film transistor ST may be connected to a first conductive region COA1 disposed on a side of a channel region CHA of the active layer ACT through a contact hole penetrating the gate insulating layer 130, the first interlayer insulating layer 141, and the second interlayer insulating layer 142. The second electrode D of the thin-film transistor ST may be connected to a second conductive region COA2 disposed on another side of the channel region CHA of the active layer ACT through a contact hole penetrating the gate insulating layer 130, the first interlayer insulating layer 141, and the second interlayer insulating layer 142.

A first organic layer 150 may be disposed on the first electrode S and the second electrode D to flatten or substantially flatten steps due to the thin-film transistor ST. The first organic layer 150 may include (e.g., may be made of) an organic layer, such as an acryl resin, an epoxy resin, a phenolic resin, a polyamide resin, or a polyimide resin.

Each of the insulating layers 130, 141, and 142 may be an inorganic layer, such as SiN, SiO, or SiON, an organic layer, an organic-inorganic layer, or a stacked layer of an inorganic layer and an organic layer. Each of the electrode layers G, S, D, and ANDE1 may be a single layer or multilayers including (e.g., made of) any one or more of molybdenum (Mo), aluminum (Al), chromium (Cr), gold (Au), titanium (Ti), nickel (Ni), neodymium (Ne), copper (Cu), and suitable alloys thereof.

A first connection electrode ANDE1 may be disposed on the first organic layer 150. The first connection electrode ANDE1 may be connected to the second electrode D of the thin-film transistor ST through a contact hole penetrating the first organic layer 150.

The light emitting element layer EML is disposed on the thin-film transistor layer TFTL. The light emitting element layer EML may include light emitting elements 170 and a bank 180.

Each of the light emitting elements 170 may include a first light emitting electrode 171, a light emitting layer 172, and a second light emitting electrode 173. An emission area of each second subpixel E2 refers to an area in which the first light emitting electrode 171, the light emitting layer 172, and the second light emitting electrode 173 are sequentially stacked on one another, so that holes from the first light emitting electrode 171 and electrons from the second light emitting electrode 173 combine together in the light emitting layer 172 to emit light. In this case, the first light emitting electrode 171 may be an anode, and the second light emitting electrode 173 may be a cathode.

The second light emitting electrode 173 may receive the touch driving signal TD in the second mode. For example, in the first mode, a contact touch may be sensed by sensing mutual capacitances between the driving electrodes TE and the sensing electrodes RE. In addition, in the second mode, a proximity touch may be sensed by sensing mutual capacitances between the second light emitting electrode 173 and the proximity sensing electrodes PE, and mutual capacitances between the second light emitting electrode 173 and the sensing electrodes RE.

The bank 180 serves to define emission areas of display pixels. The bank 180 may be formed on a second organic layer 160 to expose a portion of the first light emitting electrode 171. The bank 180 may cover edges of the first light emitting electrode 171. The first light emitting electrode 171 may be disposed in a contact hole penetrating the second organic layer 160. Therefore, the contact hole penetrating the second organic layer 160 may be filled with the first light emitting electrode 171.

In a top emission structure, the second light emitting electrode 173 may include (e.g., may be made of) a transparent conductive material (TCO) capable of transmitting light, such as ITO or IZO, or a semi-transmissive conductive material, such as magnesium (Mg), silver (Ag) or an alloy of Mg and Ag. When the second light emitting electrode 173 includes (e.g., is made of) a semi-transmissive conductive material, light output efficiency may be increased by a microcavity.

The light emitting layer 172 may be disposed on an upper surface of the first light emitting electrode 171, and on inclined surfaces of the bank 180. The second light emitting electrode 173 may be disposed on an upper surface of the light emitting layer 172, and on the inclined surfaces of the bank 180.

The thin-film encapsulation layer TFEL may be formed on the light emitting element layer EML. The thin-film encapsulation layer TFEL may include at least one inorganic layer to prevent or substantially prevent oxygen and/or moisture from penetrating into the light emitting element layer EML. In addition, the thin-film encapsulation layer TFEL may include at least one organic layer to protect the light emitting element layer EML from foreign substances, such as dust. The inorganic layer may be formed as multilayers, in which one or more inorganic layers selected from a silicon nitride layer, a silicon oxynitride layer, a silicon oxide layer, a titanium oxide layer, and an aluminum oxide layer are alternately stacked on one another. The organic layer may be an acryl resin, an epoxy resin, a phenolic resin, a polyamide resin, or a polyimide resin.

The touch layer is disposed on the thin-film encapsulation layer TFEL. The touch layer may include the sensor electrodes TE, RE, and PE. A buffer layer may be additionally formed between the thin-film encapsulation layer TFEL and the touch layer. As described above with reference to FIG. 6, the touch layer may include the driving electrodes TE, the sensing electrodes RE, the proximity sensing electrodes PE, the conductive patterns DE, the first connection portions BE1, the second connection electrodes BE2, the third connection portions BE3, the first driving lines TL1, the second driving lines TL2, the sensing lines RL, and the proximity sensing lines PL. In FIG. 17, for convenience of illustration, the driving electrodes TE, a sensing electrode RE, and a second connection electrode BE2 of the touch layer are illustrated.

The second connection electrodes BE2 are formed on the thin-film encapsulation layer TFEL. The second connection electrodes BE2 may have, but are not limited to, a stacked structure (e.g., Ti/Al/Ti) of aluminum and titanium, a stacked structure (e.g., ITO/Al/ITO) of aluminum and indium tin oxide, an APC alloy, or a stacked structure (e.g., ITO/APC/ITO) of an APC alloy and indium tin oxide.

A first touch insulating layer TINS1 is formed on the second connection electrodes BE2. The first touch insulating layer TINS1 may include (e.g., may be made of) an inorganic layer, such as a silicon nitride layer, a silicon oxynitride layer, a silicon oxide layer, a titanium oxide layer, or an aluminum oxide layer. As another example, the first touch insulating layer TINS1 may include (e.g., may be made of) an organic layer, such as an acryl resin, an epoxy resin, a phenolic resin, a polyamide resin, or a polyimide resin.

The driving electrodes TE, the sensing electrodes RE, the proximity sensing electrodes PE, the conductive patterns DE, the first connection portions BE1, the $(3-1)^{th}$ connection portions BE3-1, the $(3-2)^{th}$ connection portions BE3-2, the first driving lines TL1, the second driving lines TL2, the sensing lines RL, and the proximity sensing lines PL may be formed on the first touch insulating layer TINS1. The sensor electrodes TE, RE, and PE may have, but are not limited to, a stacked structure (e.g., Ti/Al/Ti) of aluminum and titanium, a stacked structure (e.g., ITO/Al/ITO) of aluminum and indium tin oxide, an APC alloy, or a stacked structure (e.g., ITO/APC/ITO) of an APC alloy and indium tin oxide.

First contact holes CNT1 penetrating the first touch insulating layer TINS1 to expose the second connection electrode BE2 may be formed in the first touch insulating layer TINS1. The sensing electrodes RE may be connected to the second connection electrodes BE2 through the first contact holes CNT1.

A second touch insulating layer TINS2 is formed on the sensor electrodes TE, RE, and PE. The second touch insulating layer TINS2 may flatten or substantially flatten steps formed thereunder. The second touch insulating layer TINS2 may include (e.g., may be made of) an organic layer, such as an acryl resin, an epoxy resin, a phenolic resin, a polyamide resin, or a polyimide resin.

According to the embodiment illustrated in FIG. 6, the first connection portions BE1 connecting the driving electrodes TE that are adjacent to each other in the second direction (e.g., the Y-axis direction), the driving electrodes TE, the sensing electrodes RE, the proximity sensing electrodes PE, and the $(3-1)^{th}$ through $(3-3)^{th}$ connection portions BE3-1 through BE3-3 electrically connecting the proximity sensing electrodes PE that are adjacent to each other in the second direction (e.g., the Y-axis direction) may be formed at (e.g., in or on) a different layer from that of the second connection electrodes BE2. Therefore, the driving electrodes TE, the sensing electrodes RE, and the proximity sensing electrodes PE may be electrically insulated from each other at their crossings, the sensing electrodes RE may be electrically connected to each other in the first direction (e.g., the X-axis direction), the driving electrodes TE may be electrically connected to each other in the second direction (e.g., the Y-axis direction), and the proximity sensing electrodes PE may be electrically connected to each other in the second direction (e.g., the Y-axis direction).

Figure 18:
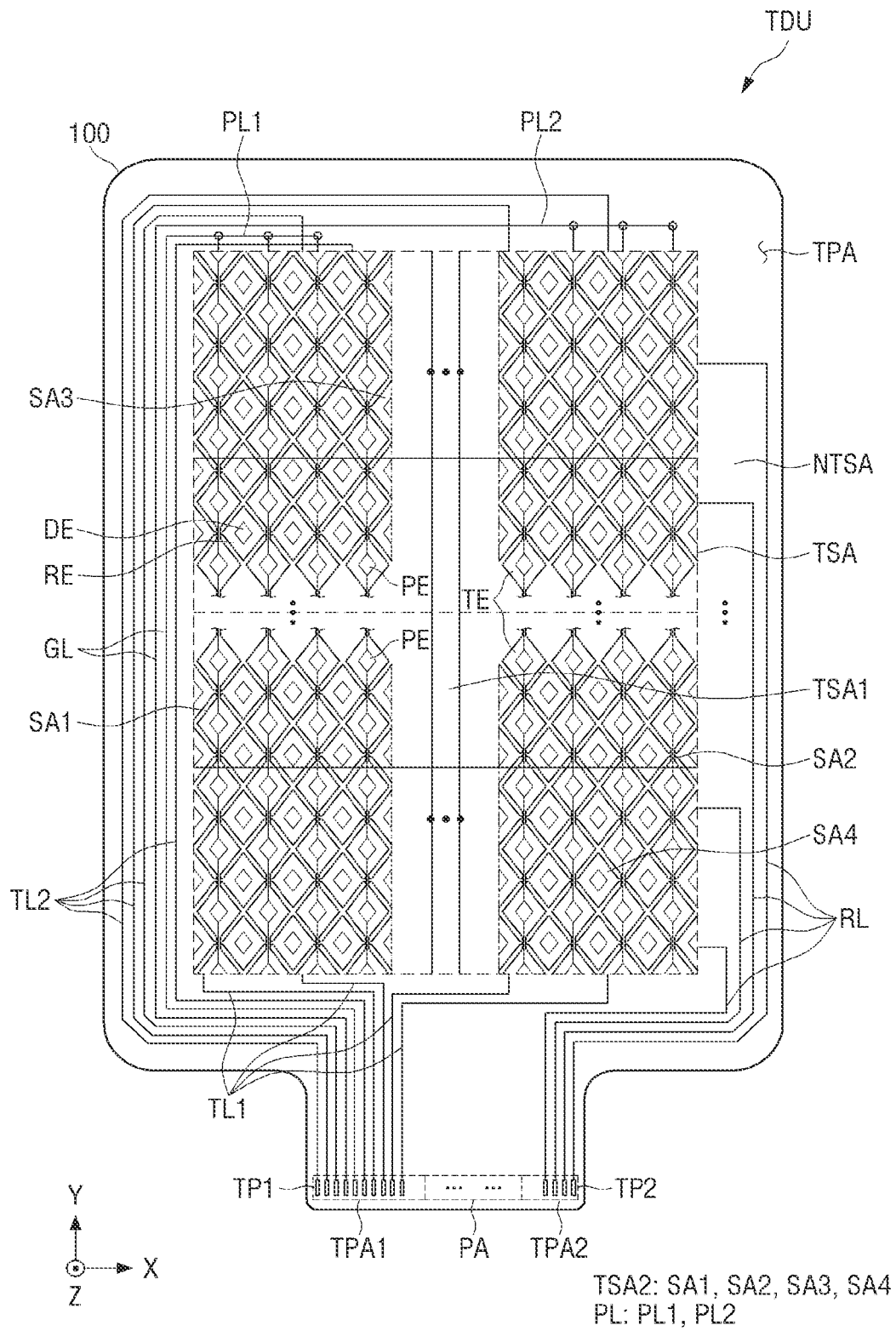
FIGS. 18-20 are plan views of touch sensing units according to embodiments.
Figure 19:
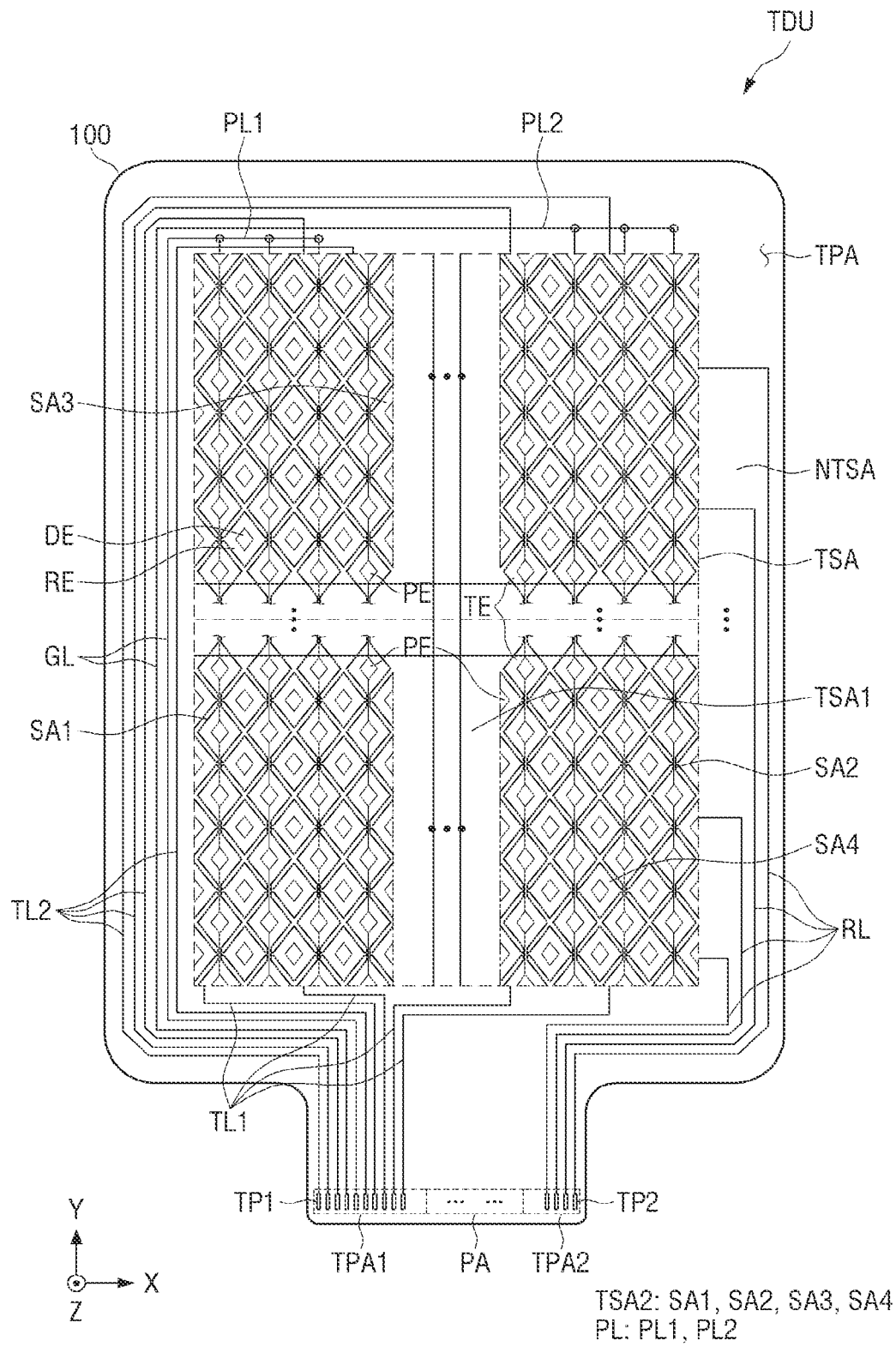
Figure 20:
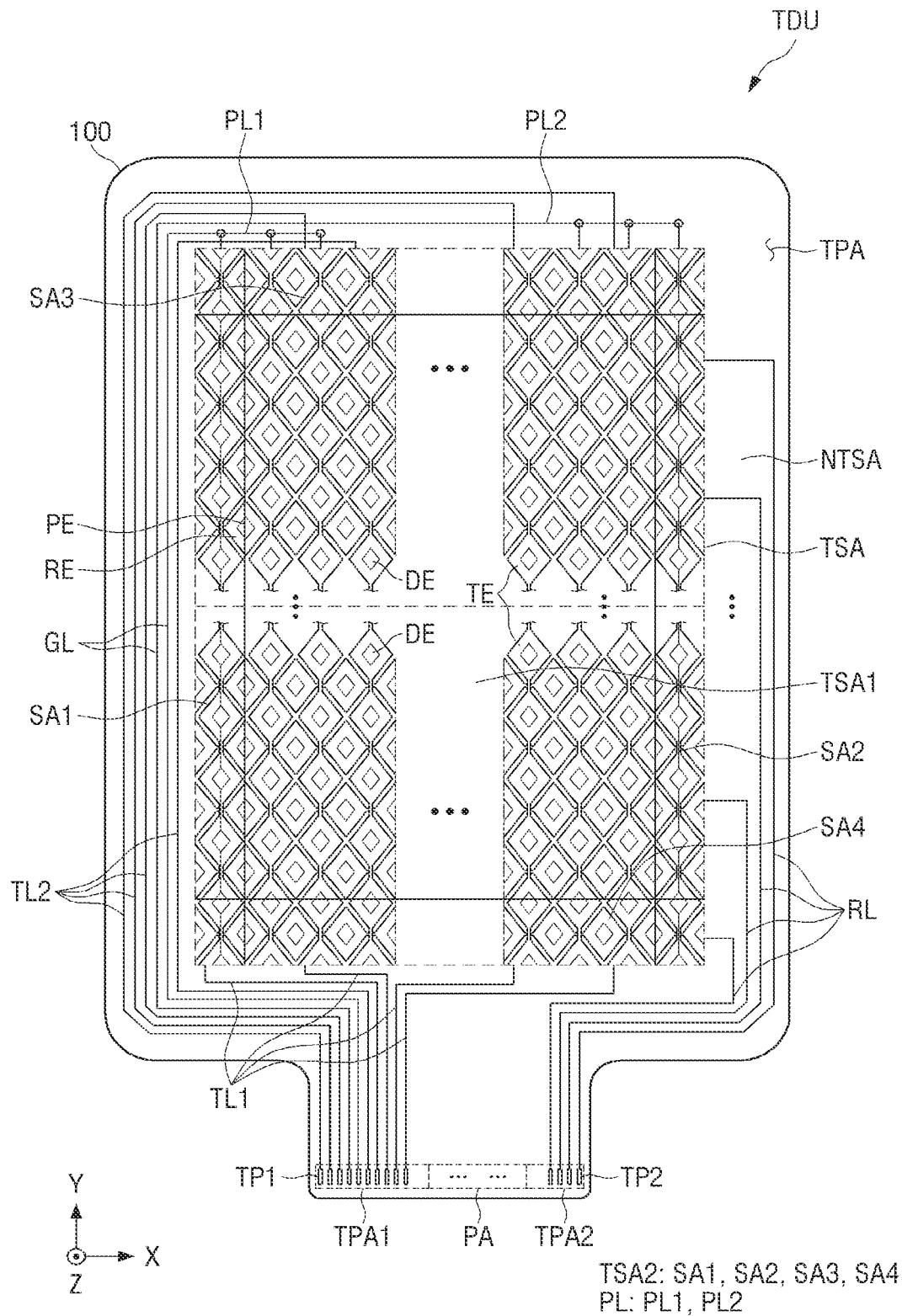

FIGS. 18 through 20 are plan views of touch sensing units according to embodiments.

Referring to FIGS. 18 through 20, first through fourth sub-touch areas SA1 through SA4 of a second touch area TSA2 may have various suitable sizes in (e.g., within) a touch area TSA. In the embodiment of FIG. 6, proximity sensing electrodes PE extending in the second direction (e.g., the Y-axis direction) are arranged along the first direction (e.g., the X-axis direction) in each of the first sub-touch area SA1 and the second sub-touch area SA2. In the embodiment of FIG. 18, the first sub-touch area SA1 and the second sub-touch area SA2 may be further extended in the first direction (e.g., the X-axis direction). In other words, the proximity sensing electrodes PE extending in the second direction (e.g., the Y-axis direction) in each of the first sub-touch area SA1 and the second sub-touch area SA2 may be arranged along the first direction (e.g., the X-axis direction) in a larger area in the embodiment of FIG. 18 than in the embodiment of FIG. 6. As another example, as in the embodiment of FIG. 19, the third sub-touch area SA3 and the fourth sub-touch area SA4 may be further extended in the second direction (e.g., the Y-axis direction). In other words, sensing electrodes RE extending in the first direction (e.g., the X-axis direction) in each of the third sub-touch area SA3 and the fourth sub-touch area SA4 may be arranged along the second direction (e.g., the Y-axis direction) in a larger area in the embodiment of FIG. 19 than in the embodiment of FIG. 6. As another example, as in the embodiment of FIG. 20, each of the first sub-touch area SA1 and the second sub-touch area SA2 may include proximity sensing electrodes PE arranged along the second direction (e.g., the Y-axis direction). In this case, each of the first sub-touch area SA1 and the second sub-touch area SA2 may include one proximity sensing electrode PE along the first direction (e.g., the X-axis direction), and may include proximity sensing electrodes PE arranged along the second direction (e.g., the Y-axis direction). In addition, each of the third sub-touch area SA3 and the fourth sub-touch area SA4 may include sensing electrodes RE arranged along the first direction (e.g., the X-axis direction). In this case, each of the third sub-touch area SA3 and the fourth sub-touch area SA4 may include one sensing electrode RE along the second direction (e.g., the Y-axis direction), and may include sensing electrodes RE arranged along the first direction (e.g., the X-axis direction).

In the embodiments illustrated in FIGS. 18 through 20, in a first mode, first mutual capacitances Cm1 may be formed between driving electrodes TE and the sensing electrodes RE in the touch area TSA. Therefore, touch sensing may be suitably performed. In addition, in a second mode, second mutual capacitances Cm2 may be formed between the driving electrodes TE and the proximity sensing electrodes PE of the first sub-touch area SA1 and the second sub-touch area SA2, and third mutual capacitances Cm3 may be formed between the driving electrodes TE and the sensing electrodes RE of the third sub-touch area SA3 and the fourth sub-touch area SA4. Therefore, proximity sensing may be suitably be performed.

Figure 21:
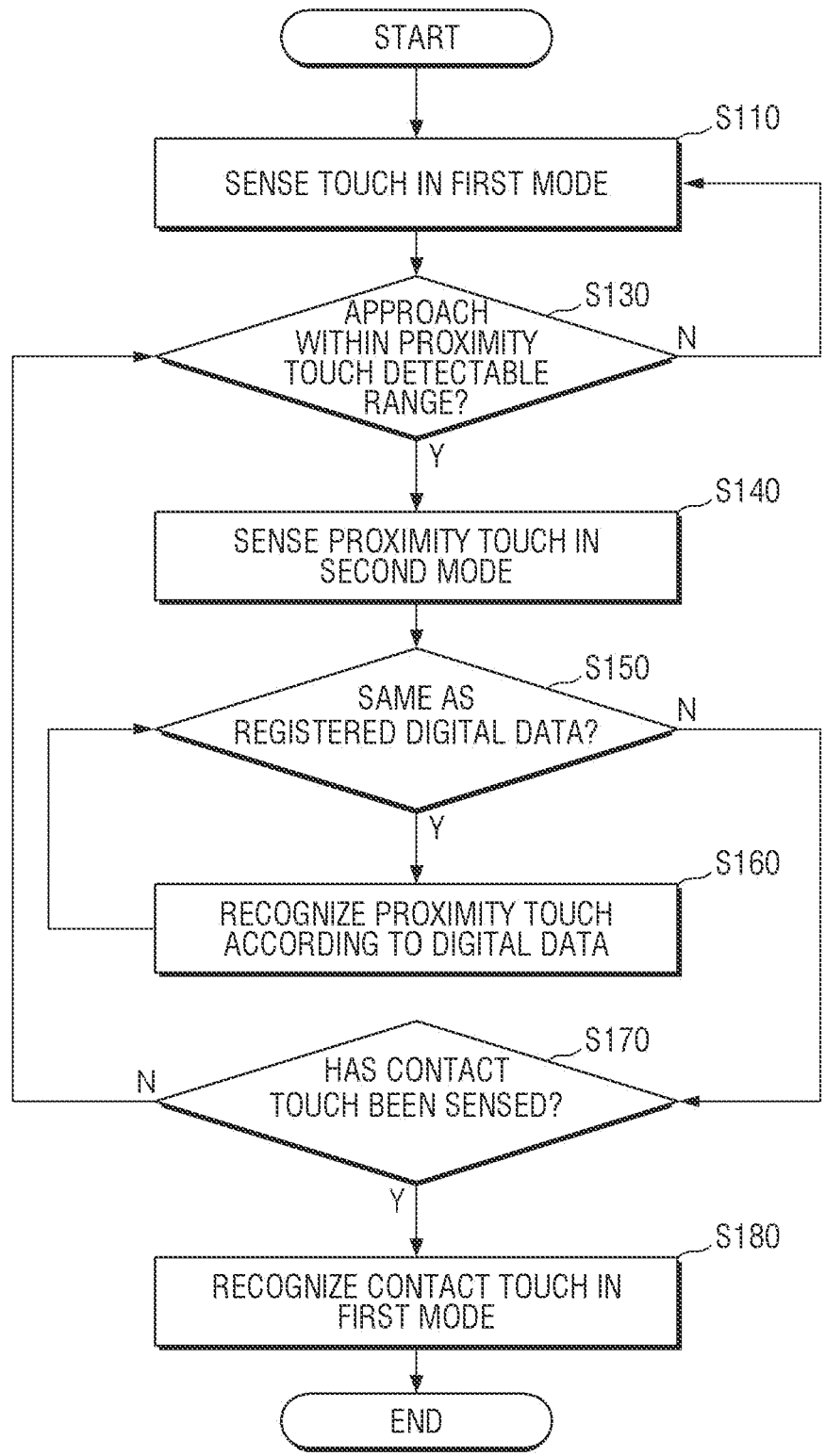
FIG. 21 is a flowchart illustrating a proximity sensing method according to an embodiment.
Figure 22:
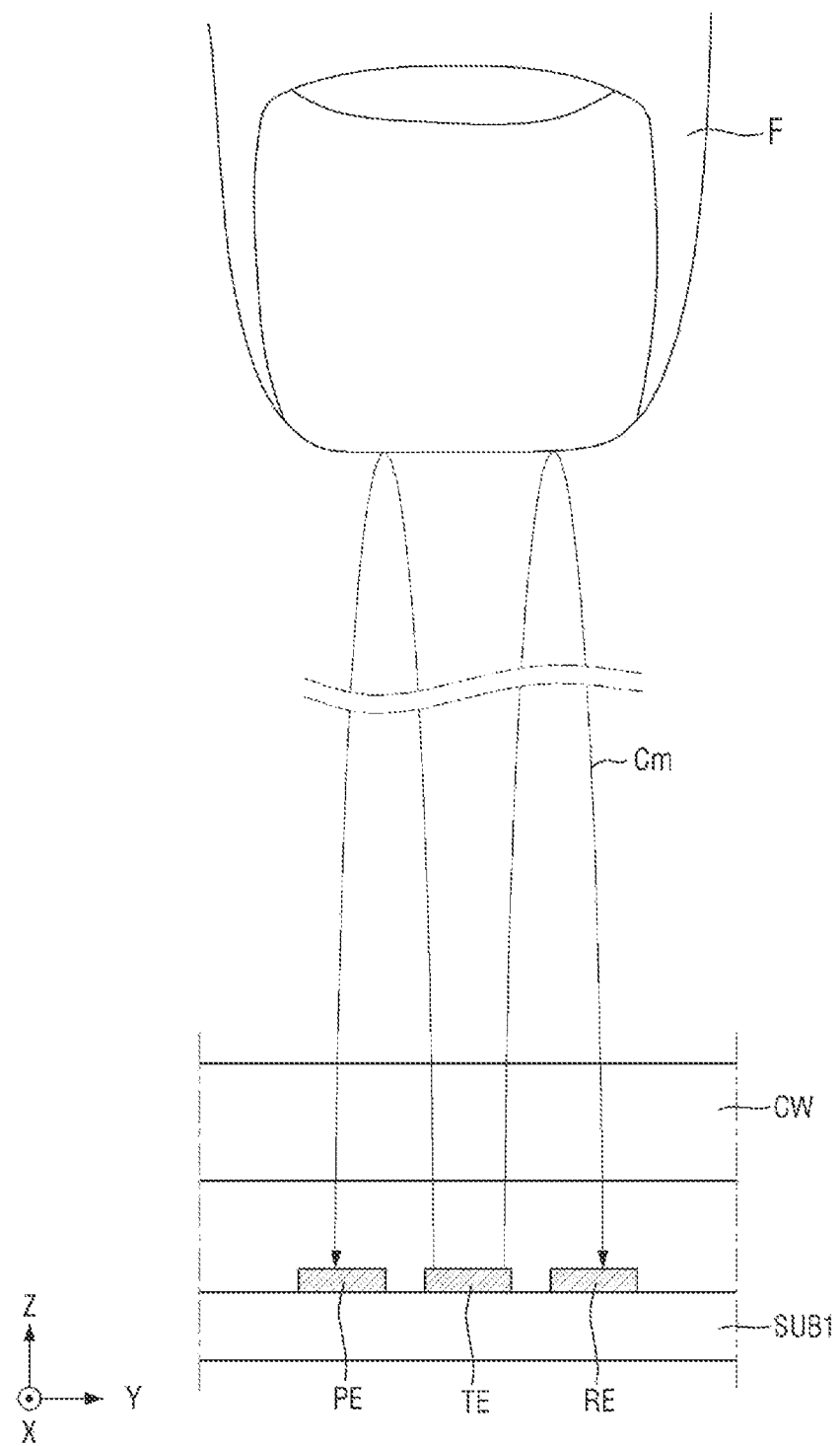
FIG. 22 is a cross-sectional view schematically illustrating a proximity sensing method according to an embodiment.
Figure 23:
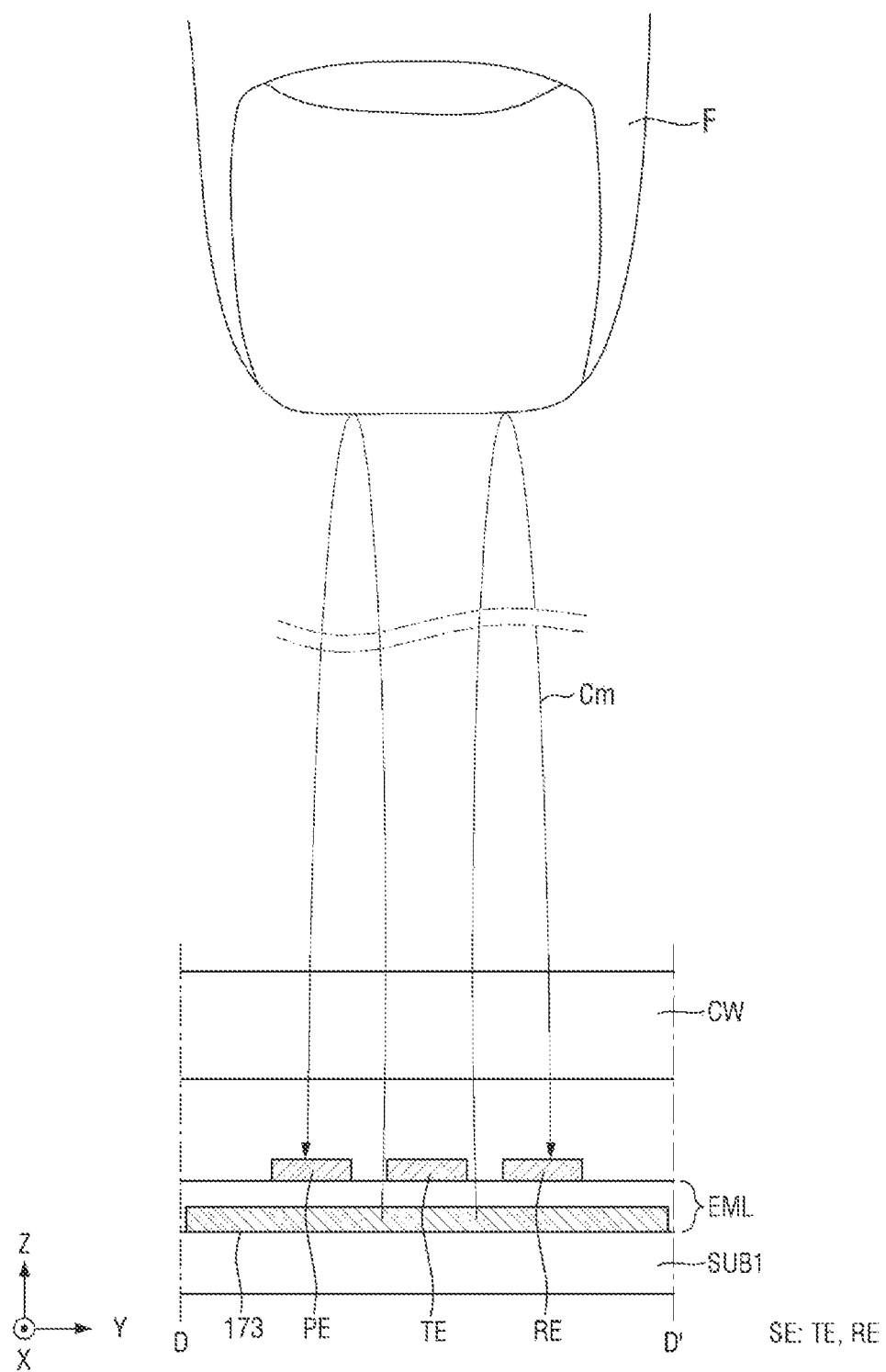
FIG. 23 is a cross-sectional view schematically illustrating a proximity sensing method according to an embodiment.

FIG. 21 is a flowchart illustrating a proximity sensing method according to an embodiment. FIG. 22 is a cross-sectional view schematically illustrating the proximity sensing method according to an embodiment. FIG. 23 is a cross-sectional view schematically illustrating a proximity sensing method according to an embodiment.

Referring to FIGS. 21 through 23, the touch driving circuit 400 senses a touch in the first mode (e.g., operation S110). The touch driving circuit 400 may sense the first mutual capacitances Cm1 between the driving electrodes TE and the sensing electrodes RE in the first mode, and may calculate the first digital data. When a person or an object approaches the touch sensing unit TDU, the first mutual capacitances Cm1 may have smaller values than mutual capacitances of a contact touch. For example, as illustrated in FIG. 22, when a user's finger F approaches the touch sensing unit TDU, the first mutual capacitances Cm1 between the driving electrodes TE and the sensing electrodes RE may be sensed. As another example, as illustrated in FIG. 23, when a user's finger F approaches the touch sensing unit TDU, mutual capacitances between the second light emitting electrode 173 and the sensing electrodes RE may be sensed.

Next, it may be determined whether a person or an object approaches within a range in which a proximity touch may be sensed (e.g., operation S130). For example, when a person or an object approaches the touch sensing unit TDU, the magnitudes of the first mutual capacitances Cm1 may increase. In other words, as the person or the object becomes closer to the touch sensing unit TDU, the magnitudes of the first mutual capacitances Cm1 may increase. Therefore, when the touch driving circuit 400 senses a suitable magnitude (e.g., a predetermined or pre-stored magnitude) of a mutual capacitance, it may determine that a person or an object has approached within the range in which a proximity touch may be sensed.

When a person or an object approaches within the range in which a proximity touch may be sensed (e.g., Y in operation S130), the touch driving circuit 400 may sense a proximity touch in the second mode (e.g., operation S140). The touch driving circuit 400 may recognize the proximity touch (e.g., operation S160) by determining whether sensed digital data and registered digital data are the same or substantially the same with each other (e.g., operation S150).

The touch driving circuit 400 may calculate digital data based on mutual capacitances sensed in the second mode. In addition, the touch driving circuit 400 may recognize a proximity touch by determining whether the calculated digital data is the same or substantially the same as the registered digital data. For example, the touch driving circuit 400 may analyze the digital data in the second mode to determine whether a person or an object is in proximity. For example, when the sum of the digital data calculated in the second mode is equal to or greater than a second threshold value, the touch driving circuit 400 may determine that a person or an object is in proximity. As another example, the touch driving circuit 400 may calculate distances from the first through fourth sub-touch areas SA1 through SA4 by comparing a plurality of pieces of digital data with the registered digital data in the second mode. In addition, the touch driving circuit 400 may determine whether the person or the object has moved by continuously receiving digital data.

On the other hand, when a person or an object does not approach within the range in which a proximity touch may be sensed (e.g., N in operation S130), the touch driving circuit 400 may sense a touch in the first mode.

When the sensed digital data and the registered digital data are not the same (e.g., N in operation S150), the touch driving circuit 400 may sense a contact touch (e.g., operation S170), and may recognize the contact touch in the first mode by switching to the first mode (e.g., operation S180). For example, when a user approaches the touch sensing unit TDU to directly touch the touch sensing unit TDU, it may be switched to the first mode. In this case, recognizing a proximity touch in the second mode may not be performed. In other words, when the digital data sensed by the touch driving circuit 400 according to the second mode and the registered data are not the same, the mode may be changed to the first mode to directly sense a touch.

Figure 24:
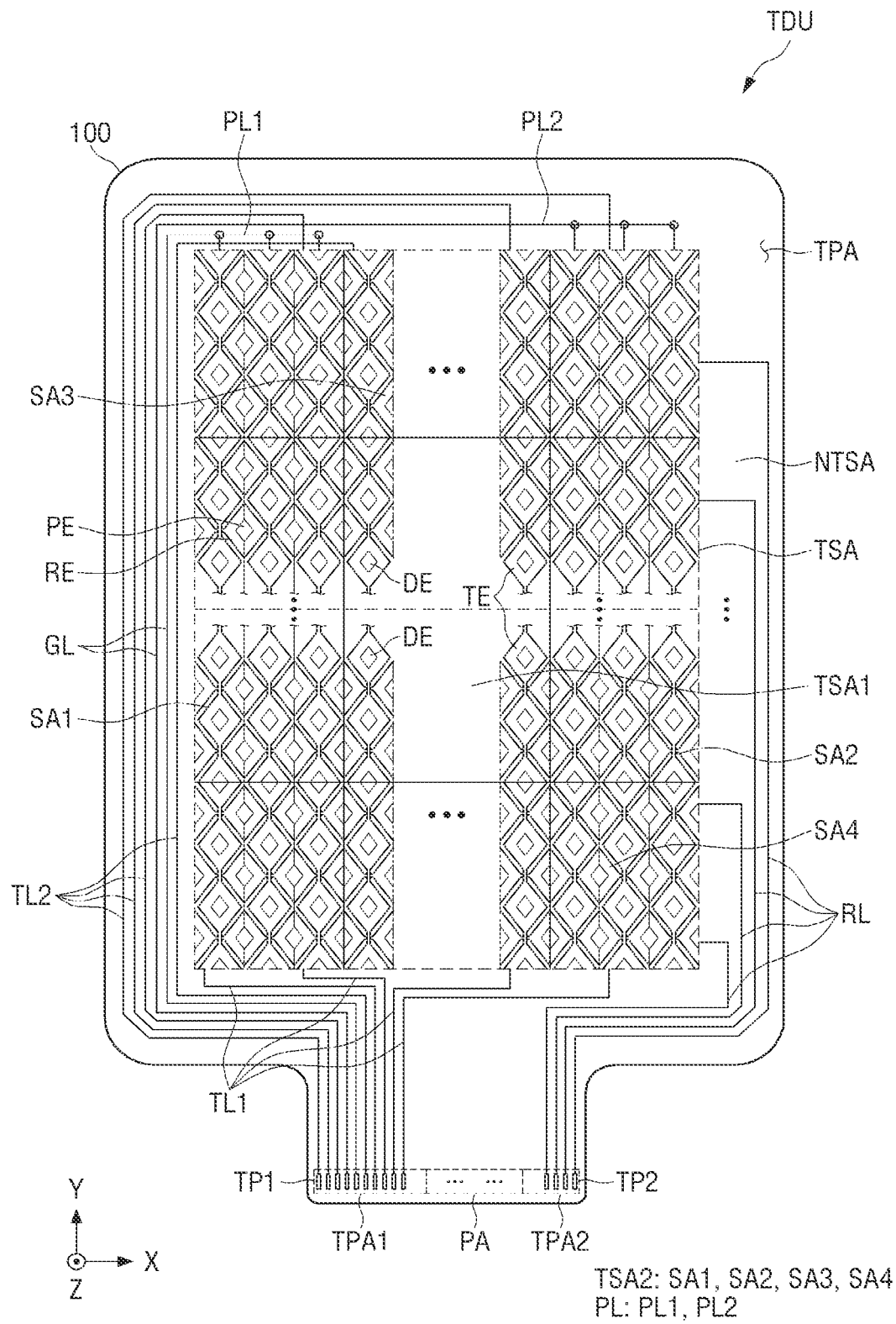
FIG. 24 is a plan view of a touch sensing unit according to an embodiment.
Figure 25:
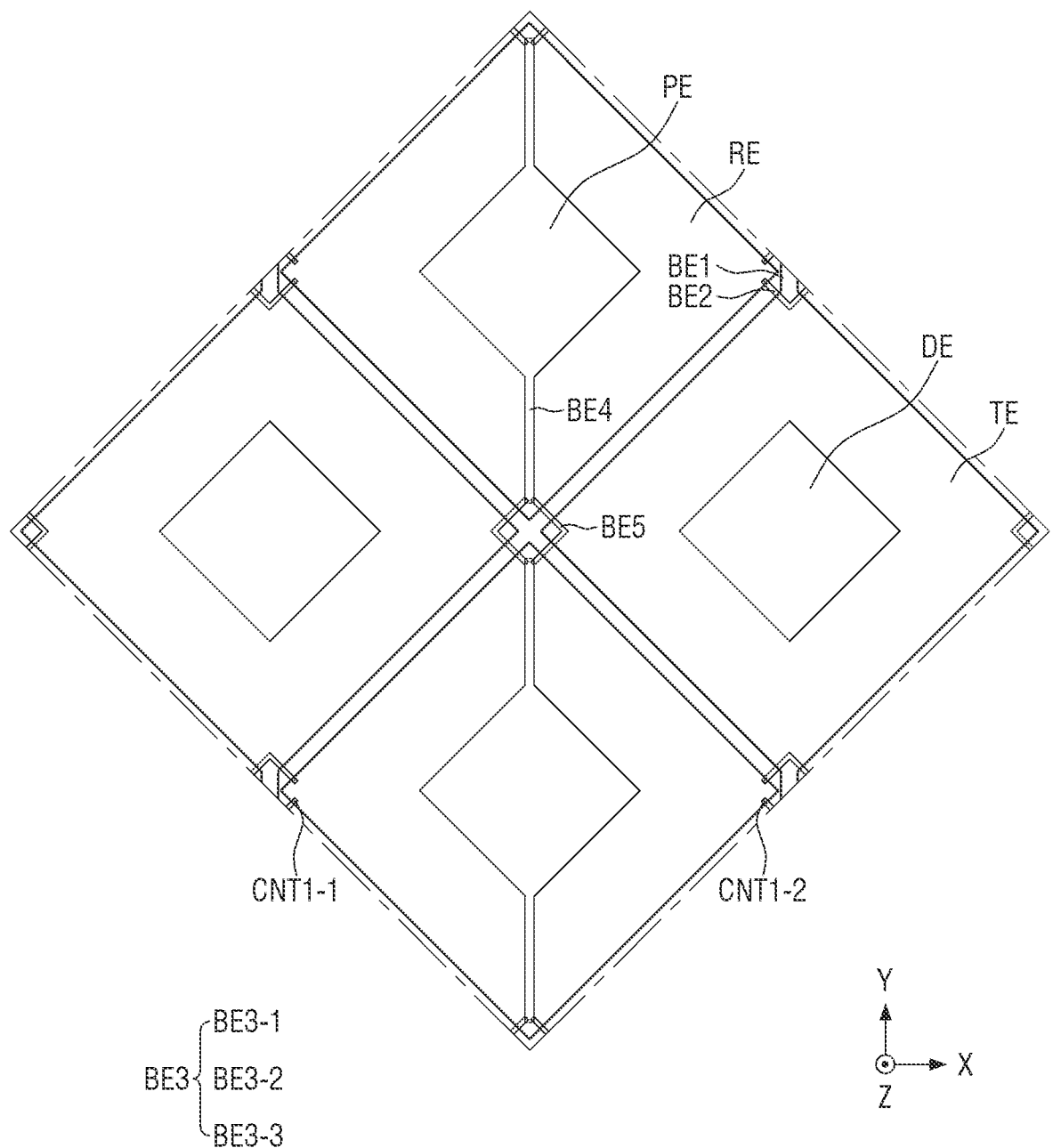
FIG. 25 is an enlarged plan view of a portion illustrated in FIG. 24.

FIG. 24 is a plan view of a touch sensing unit according to an embodiment. FIG. 25 is an enlarged plan view of a portion illustrated in FIG. 24.

The embodiments of FIGS. 24 and 25 may be the same or substantially the same as the embodiments described above with reference to FIGS. 6 through 11, except that the proximity sensing electrodes PE may not be surrounded (e.g., around peripheries thereof) by the driving electrodes TE, and may be surrounded (e.g., around peripheries thereof) by the sensing electrodes RE. Thus, the differences from the embodiments of FIGS. 6 through 11 will be mainly described hereinafter, and redundant description thereof may not be repeated.

Referring to FIG. 24, a touch area TSA includes a first touch area TSA1 for sensing a contact touch, and a second touch area TSA2 for sensing a contact touch and for sensing whether a person or an object is in proximity. In other words, in a first mode, a touch may be directly sensed in the first touch area TSA1 and the second touch area TSA2. In a second mode, a proximity touch may be sensed in the second touch area TSA2. In addition, the second touch area TSA2 may include a first sub-touch area SA1, a second sub-touch area SA2, a third sub-touch area SA3, and a fourth sub-touch area SA4. The first sub-touch area SA1 and the second sub-touch area SA2 may be areas for sensing mutual capacitances between the driving electrodes TE and the proximity sensing electrodes PE, and the third sub-touch area SA3 and the fourth sub-touch area SA4 may be areas for sensing mutual capacitances between the driving electrodes TE and the sensing electrodes RE. The first touch area TSA1 and the second touch area TSA2 are the same or substantially the same as those described in the embodiments above with reference to FIGS. 6 through 11, and thus, redundant description thereof may not be repeated.

The proximity sensing electrodes PE may be disposed at (e.g., in or on) a portion of the second touch area TSA2. The proximity sensing electrodes PE may be disposed along the second direction (e.g., the Y-axis direction), and may be electrically connected to each other. For example, the proximity sensing electrodes PE may be disposed at (e.g., in or on) the first sub-touch area SA1 and the second sub-touch area SA2 along the second direction (the Y-axis direction). In addition, the proximity sensing electrodes PE may be arranged along the first direction (e.g., the X-axis direction). For example, the proximity sensing electrodes PE may extend in the second direction (e.g., the Y-axis direction), and may be arranged along the first direction (e.g., the X-axis direction). In other words, the proximity sensing electrodes PE may be arranged along the first direction (e.g., the X-axis direction) in each of the first sub-touch area SA1 and the second sub-touch area SA2. Accordingly, the proximity sensing electrodes PE may not be disposed at (e.g., in or on) a portion of each of the third sub-touch area SA3 and the fourth sub-touch area SA4. The driving electrodes TE and the sensing electrodes RE are the same or substantially the same as those of the embodiments described above with reference to FIGS. 6 through 11, and thus, redundant description thereof may not be repeated.

In the first touch area TSA1, conductive patterns DE may be surrounded (e.g., around peripheries thereof) by the driving electrodes TE and the sensing electrodes RE, respectively. The conductive patterns DE disposed at (e.g., in or on) a portion of the second touch area TSA2 may be surrounded (e.g., around peripheries thereof) by the driving electrodes TE, respectively. For example, in the first sub-touch area SA1 and the second sub-touch area SA2, the conductive patterns DE may be surrounded (e.g., around peripheries thereof) by the driving electrodes TE, respectively. In addition, in the third sub-touch area SA3 and the fourth sub-touch area SA4, the conductive patterns DE may be surrounded (e.g., around peripheries thereof) by the sensing electrodes RE and the driving electrodes TE, respectively.

In order for the sensing electrodes RE and the driving electrodes TE to be electrically insulated from each other at their crossings, the sensing electrodes RE that are adjacent to each other in the first direction (e.g., the X-axis direction) may be connected to each other through second connection electrodes BE2. In addition, in order for the sensing electrodes RE and the proximity sensing electrodes PE to be electrically insulated from each other at their crossings, the driving electrodes TE that are adjacent to each other in the second direction (e.g., the Y-axis direction) may be connected through a first connection portion BE1.

In order for the driving electrodes TE and the proximity sensing electrodes PE to be electrically insulated from each other at their crossings, the proximity sensing electrodes PE that are adjacent to each other in the second direction (e.g., the Y-axis direction) may be connected to each other through a fourth connection portion BE4 and fifth connection electrodes BE5.

Referring further to FIG. 25, the sensing electrodes RE may be disposed along the first direction (e.g., the X-axis direction), and may be electrically connected to each other. The driving electrodes TE may be disposed along the second direction (e.g., the Y-axis direction), and may be electrically connected to each other. The proximity sensing electrodes PE may be disposed along the second direction (e.g., the Y-axis direction) and may be electrically connected to each other.

The sensing electrodes RE and the proximity sensing electrodes PE may be disposed side by side to each other in the second direction (e.g., the Y-axis direction). The proximity sensing electrodes PE may be surrounded (e.g., around peripheries thereof) by the sensing electrodes RE, respectively. The conductive patterns DE may be surrounded (e.g., around peripheries thereof) by the driving electrodes TE, respectively.

The size of each of the sensing electrodes RE may be greater than the size of each of the proximity sensing electrodes PE. The size of each of the sensing electrodes RE may be greater than the size of each of the conductive patterns DE.

The first connection portion BE1 may be formed at (e.g., in or on) the same layer as that of the driving electrodes TE, and may extend from the driving electrodes TE. The driving electrodes TE and the first connection portion BE1 may include (e.g., may be made of) the same material as each other. In order for the sensing electrodes RE and the driving electrodes TE to be electrically insulated from each other at their crossings, the sensing electrodes RE that are adjacent to each other in the first direction (e.g., the X-axis direction) may be connected to each other through the second connection electrodes BE2. The second connection electrodes BE2 may be formed at (e.g., in or on) a different layer from that of the sensing electrodes RE, and may be connected to the sensing electrodes RE through first contact holes CNT1.

The fourth connection portion BE4 may be electrically insulated from each of the sensing electrodes RE. The fourth connection portion BE4 may be spaced apart from each of the sensing electrodes RE. The fourth connection portion BE4 may be connected to a proximity sensing electrode PE surrounded (e.g., around a periphery thereof) by one of the sensing electrodes RE that are adjacent to each other in the second direction (e.g., the Y-axis direction). The fourth connection portion BE4 may be connected to a proximity sensing electrode PE that is surrounded (e.g., around a periphery thereof) by another one of the sensing electrodes RE that are adjacent to each other in the second direction (e.g., the Y-axis direction).

The fifth connection electrodes BE5 may be connected to the fourth connection portion BE4. The fifth connection electrodes BE5 may be formed on a different layer from that of the driving electrodes TE, and may be connected to the fourth connection portion BE4 through contact holes.

The fifth connection electrodes BE5 may be bent at least once. Although the fifth connection electrodes BE5 are illustrated as being bent in the shape of "<" or ">" in FIG. 25, the shape of each of the fifth connection electrodes BE5 is not limited thereto. In addition, because the proximity sensing electrodes PE that are adjacent to each other in the second direction (e.g., the Y-axis direction) are connected to each other by a plurality of fifth connection electrodes BE5, even if any one of the fifth connection electrodes BE5 is broken, the proximity sensing electrodes PE that are adjacent to each other in the first direction (e.g., the X-axis direction) may be stably connected to each other. Although the proximity sensing electrodes PE that are adjacent to each other are illustrated as being connected to each other by two fifth connection electrodes BE5 in FIG. 25, the number of fifth connection electrodes BE5 is not limited thereto.

In the embodiments illustrated in FIGS. 24 and 25, in the first mode, first mutual capacitances may be formed between the driving electrodes TE and the sensing electrodes RE in the touch area TSA. Therefore, touch sensing may be sufficiently performed. In addition, in the second mode, second mutual capacitances may be formed between the driving electrodes TE and the proximity sensing electrodes PE of the first sub-touch area SA1 and the second sub-touch area SA2, and third mutual capacitances may be formed between the driving electrodes TE and the sensing electrodes RE of the third sub-touch area SA3 and the fourth sub-touch area SA4. Therefore, proximity sensing may be sufficiently performed.

Figure 26:
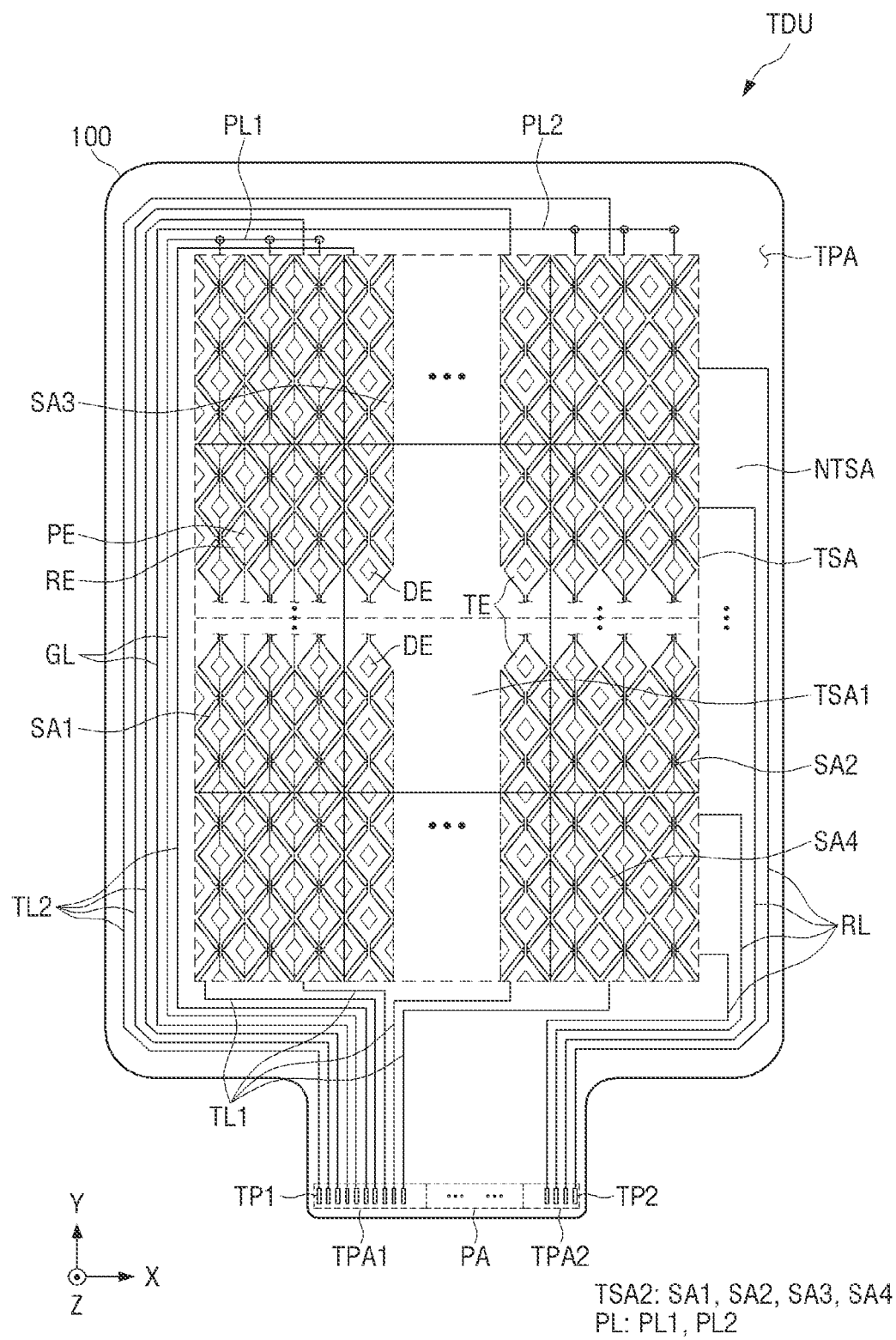
FIGS. 26 and 27 are plan views of touch sensing units according to embodiments.
Figure 27:
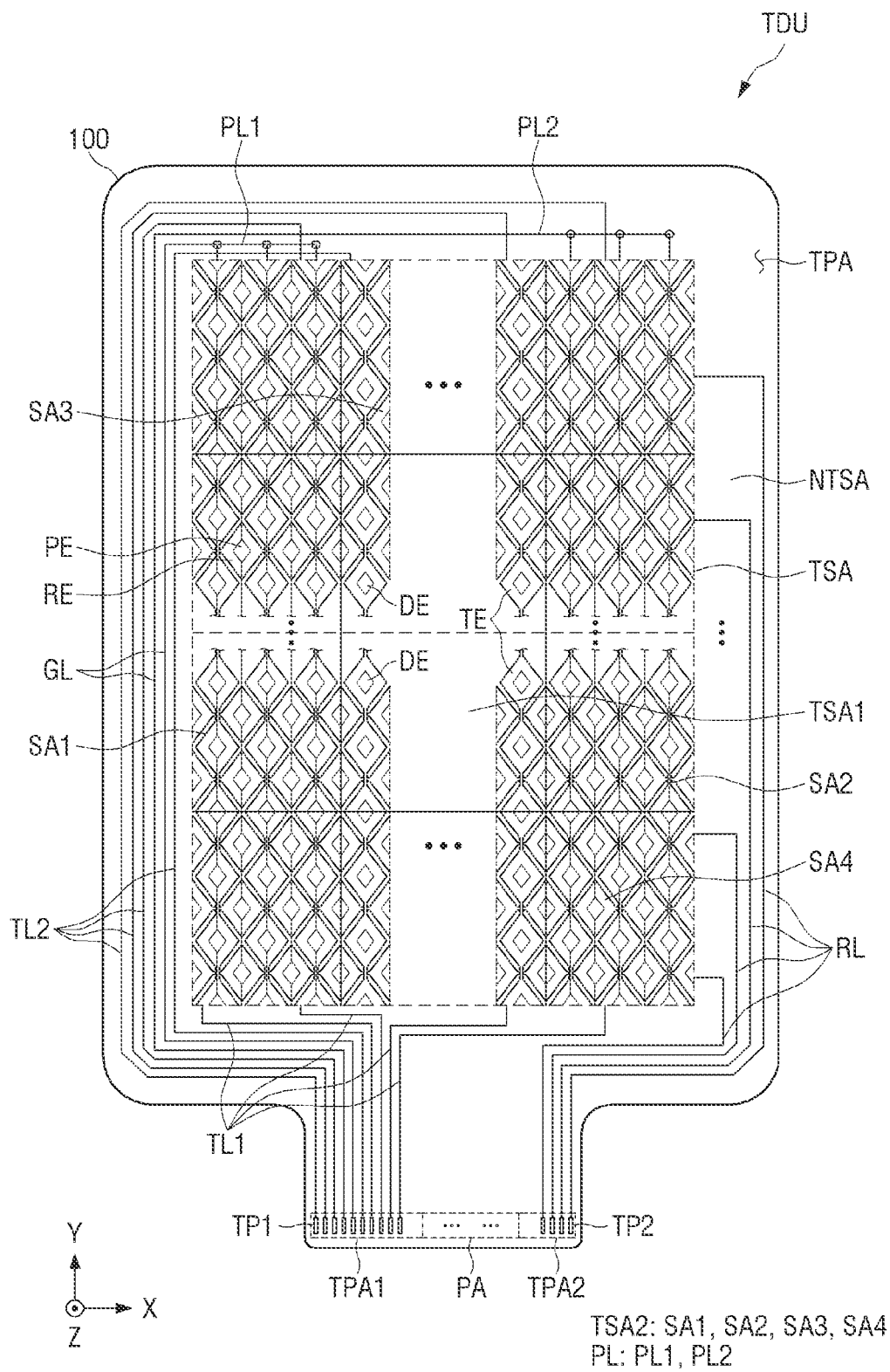
Figure 28:
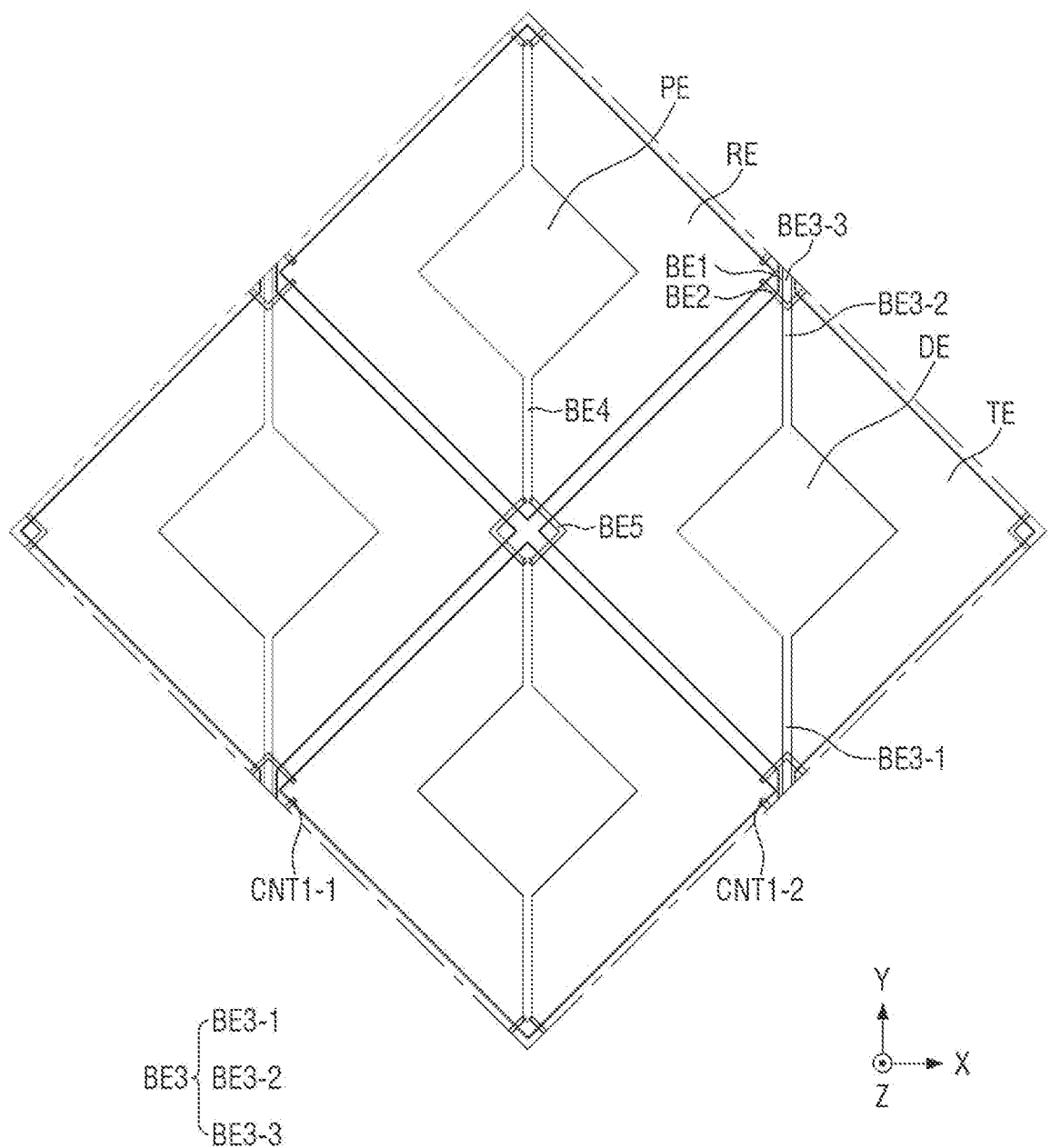
FIG. 28 is an enlarged plan view of a portion illustrated in FIG. 26.

FIGS. 26 and 27 are plan views of touch sensing units according to embodiments. FIG. 28 is an enlarged plan view of a portion illustrated in FIG. 26.

The embodiments illustrated in FIGS. 26 through 28 are the same or substantially the same as the embodiments described above with reference to FIGS. 6 through 11, except that the proximity sensing electrodes PE are surrounded (e.g., around peripheries thereof) by the driving electrodes TE and the sensing electrodes RE. Therefore, the differences may be mainly described hereinafter, and redundant description may not be repeated.

Referring to FIGS. 26 and 27, a touch area TSA includes a first touch area TSA1 for sensing a contact touch, and a second touch area TSA2 for sensing a contact touch and for sensing whether a person or an object is in proximity. In other words, in a first mode, a touch may be directly sensed in the first touch area TSA1 and the second touch area TSA2. In a second mode, a proximity touch may be sensed in the second touch area TSA2. In addition, the second touch area TSA2 may include a first sub-touch area SA1, a second sub-touch area SA2, a third sub-touch area SA3, and a fourth sub-touch area SA4. The first sub-touch area SA1 and the second sub-touch area SA2 may be areas for sensing mutual capacitances between the driving electrodes TE and the proximity sensing electrodes PE. The third sub-touch area SA3 and the fourth sub-touch area SA4 may be areas for sensing mutual capacitances between the driving electrodes TE and the sensing electrodes RE. The first touch area TSA1 and the second touch area TSA2 are the same or substantially the same as those of the embodiments described above with reference to FIGS. 6 through 11, and thus, redundant description thereof may not be repeated.

The proximity sensing electrodes PE may be disposed at (e.g., in or on) the first sub-touch area SA1 and the second sub-touch area SA2 along the second direction (e.g., the Y-axis direction). In addition, the proximity sensing electrodes PE may be arranged along the first direction (e.g., the X-axis direction). For example, the proximity sensing electrodes PE may extend in the second direction (e.g., the Y-axis direction), and may be arranged along the first direction (e.g., the X-axis direction). In other words, the proximity sensing electrodes PE may be arranged at (e.g., in or on) each of the first sub-touch area SA1 and the second sub-touch area SA2 along the first direction (e.g., the X-axis direction). Accordingly, the proximity sensing electrodes PE may not be disposed at (e.g., in or on) a portion of each of the third sub-touch area SA3 and the fourth sub-touch area SA4. The driving electrodes TE and the sensing electrodes RE are the same or substantially the same as those of the embodiments described above with reference to FIGS. 6 through 11, and thus, redundant description thereof may not be repeated.

The proximity sensing electrodes PE may be surrounded (e.g., around peripheries thereof) by the driving electrodes TE and/or the sensing electrodes RE. The proximity sensing electrodes PE may be surrounded (e.g., around peripheries thereof) by the driving electrodes TE and the sensing electrodes RE, or may be surrounded (e.g., around peripheries thereof) by the driving electrodes TE. For example, as illustrated in FIG. 26, the proximity sensing electrodes PE of the first sub-touch area SA1 may be surrounded (e.g., around peripheries thereof) by the driving electrodes TE and the sensing electrodes RE, and the proximity sensing electrodes PE of the second sub-touch area SA2 may be surrounded (e.g., around peripheries thereof) by the driving electrodes TE. As another example, as illustrated in FIG. 27, all of the proximity sensing electrodes PE of the first sub-touch area SA1 and the second sub-touch area SA2 may be surrounded (e.g., around peripheries thereof) by the driving electrodes TE and the sensing electrodes RE.

In the first touch area TSA1, conductive patterns DE may be surrounded (e.g., around peripheries thereof) by the driving electrodes TE and the sensing electrodes RE, respectively. The conductive pattern DE may not be disposed at (e.g., in or on) a portion of the second touch area TSA2. For example, the conductive patterns DE may not be disposed at (e.g., in or on) the first sub-touch area SA1 and the second sub-touch area SA2. In other words, the proximity sensing electrodes PE may be surrounded (e.g., around peripheries thereof) by the driving electrodes TE or the sensing electrodes RE, respectively.

In order for the driving electrodes TE and the proximity sensing electrodes PE to be electrically insulated from each other at their crossings, the proximity sensing electrodes PE that are adjacent to each other in the second direction (e.g., the Y-axis direction) may be connected to each other through a fourth connection portion BE4 and fifth connection electrodes BE5.

Referring further to FIG. 28, the sensing electrodes RE may be disposed along the first direction (e.g., the X-axis direction), and may be electrically connected to each other. The driving electrodes TE may be disposed along the second direction (e.g., the Y-axis direction), and may be electrically connected to each other. The proximity sensing electrodes PE may be disposed along the second direction (e.g., the Y-axis direction), and may be electrically connected to each other.

The driving electrodes TE and the proximity sensing electrodes PE may be disposed side by side with each other along the second direction (e.g., the Y-axis direction). The proximity sensing electrodes PE may be surrounded (e.g., around peripheries thereof) by the driving electrodes TE, respectively. The conductive patterns DE may be surrounded (e.g., around peripheries thereof) by the sensing electrodes RE, respectively.

In addition, the sensing electrodes RE and the proximity sensing electrodes PE may be disposed side by side with each other along the second direction (e.g., the Y-axis direction). The proximity sensing electrodes PE may be surrounded (e.g., around peripheries thereof) by the sensing electrodes RE, respectively. The conductive patterns DE may be surrounded (e.g., around peripheries thereof) by the driving electrodes RE, respectively. The size of each of the sensing electrodes RE may be greater than the size of each of the proximity sensing electrodes PE. The size of each of the sensing electrodes RE may be greater than the size of each of the conductive patterns DE.

A first connection portion BE1 may be formed at (e.g., in or on) the same layer as that of the driving electrodes TE, and may extend from the driving electrodes TE. The driving electrodes TE and the first connection portion BE1 may include (e.g., may be made of) the same material as each other. In order for the sensing electrodes RE and the driving electrodes TE to be electrically insulated from each other at their crossings, the sensing electrodes RE that are adjacent to each other in the first direction (e.g., the X-axis direction) may be connected to each other through second connection electrodes BE2. The second connection electrodes BE2 may be formed at (e.g., in or on) a different layer from that of the sensing electrodes RE, and may be connected to the sensing electrodes RE through first contact holes CNT1.

A third connection portion BE3 may include a $(3-1)^{th}$ connection portion BE3-1, a $(3-2)^{th}$ connection portion BE3-2, and a $(3-3)^{th}$ connection portion BE3-3. Each of the $(3-1)^{th}$ connection portion BE3-1 and the $(3-2)^{th}$ connection portion BE3-2 may be electrically insulated from a driving electrode TE. Each of the $(3-1)^{th}$ connection portion BE3-1 and the $(3-2)^{th}$ connection portion BE3-2 may be spaced apart from the driving electrode TE.

The $(3-1)^{th}$ connection portion BE3-1 may be connected to a proximity sensing electrode PE surrounded (e.g., around a periphery thereof) by one of the driving electrodes TE that are adjacent to each other in the second direction (e.g., the Y-axis direction). The $(3-2)^{th}$ connection portion BE3-2 may be connected to a proximity sensing electrode PE surrounded (e.g., around a periphery thereof) by another one of the driving electrodes TE that are adjacent to each other in the second direction (e.g., the Y-axis direction).

The $(3-3)^{th}$ connection portion BE3-3 may be connected to each of the $(3-1)^{th}$ connection portion BE3-1 and the $(3-2)^{th}$ connection portion BE3-2. The $(3-3)^{th}$ connection portion BE3-3 may be formed at (e.g., in or on) the same layer as that of the $(3-1)^{th}$ connection portion BE3-1 and the $(3-2)^{th}$ connection portion BE3-2, and may be connected to the $(3-1)^{th}$ connection portion BE3-1 and the $(3-2)^{th}$ connection portion BE3-2.

The fourth connection portion BE4 may be electrically insulated from each of the sensing electrodes RE. The fourth connection portion BE4 may be spaced apart from each of the sensing electrodes RE. The fourth connection portion BE4 may be connected to a proximity sensing electrode PE surrounded (e.g., around a periphery thereof) by one of the sensing electrodes RE that are adjacent to each other in the second direction (e.g., the Y-axis direction). The fourth connection portion BE4 may be connected to a proximity sensing electrode PE surrounded (e.g., around a periphery thereof) by another one of the sensing electrodes RE that are adjacent to each other in the second direction (e.g., the Y-axis direction).

The fifth connection electrodes BE5 may be connected to the fourth connection portion BE4. The fifth connection electrodes BE5 may be formed at (e.g., in or on) a different layer from that of the driving electrodes TE, and may be connected to the fourth connection portion BE4 through contact holes.

The fifth connection electrodes BE5 may be bent at least once. Although the fifth connection electrodes BE5 are illustrated as being bent in the shape of "<" or ">" in FIG. 28, the shape of each of the fifth connection electrodes BE5 is not limited thereto. In addition, because the proximity sensing electrodes PE that are adjacent to each other in the second direction (e.g., the Y-axis direction) are connected to each other by a plurality of fifth connection electrodes BE5, even if any one of the fifth connection electrodes BE5 is broken, the proximity sensing electrodes PE that are adjacent to each other in the first direction (e.g., the X-axis direction) may be stably connected to each other. Although the proximity sensing electrodes PE that are adjacent to each other are illustrated as being connected to each other by two fifth connection electrodes BE5 in FIG. 28, the number of fifth connection electrodes BE5 is not limited thereto.

According to the embodiments described above with reference to FIGS. 26 through 28, the proximity sensing electrodes RE of the first sub-touch area SA1 and the second sub-touch area SA2 may be surrounded (e.g., around peripheries thereof) by the driving electrodes TE or the sensing electrodes RE. The proximity sensing electrodes PE surrounded (e.g., around peripheries thereof) by the driving electrodes TE may be electrically connected to each other through the third connection portion BE3, and the proximity sensing electrodes PE surrounded (e.g., around peripheries thereof) by the sensing electrodes RE may be electrically connected to each other through the fourth connection portion BE4 and the fifth connection electrodes BE5.

Accordingly, in the first mode, first mutual capacitances may be formed between the driving electrodes TE and the sensing electrodes RE in the touch area TSA. Therefore, touch sensing may be sufficiently performed. In addition, in the second mode, second mutual capacitances may be formed between the driving electrodes TE and the proximity sensing electrodes PE of the first sub-touch area SA1 and the second sub-touch area SA2, and third mutual capacitances may be formed between the driving electrodes TE and the sensing electrodes RE of the third sub-touch area SA3 and the fourth sub-touch area SA4. Therefore, proximity sensing may be sufficiently performed.

In addition, because the number of proximity sensing electrodes PE disposed at (e.g., in or on) the same first sub-touch area SA1 increases, the area of the electrodes for sensing a proximity touch may increase. Accordingly, third mutual capacitances Cm3 of the driving electrode TE and the proximity sensing electrodes PE may increase, and thus, a proximity touch may be accurately sensed.

A display device according to one or more embodiments of the present disclosure may sense a contact touch of a person or an object by sensing amounts of change in first mutual capacitances in a touch area, and may sense whether a person or an object is in proximity by sensing amounts of change in second mutual capacitances and third mutual capacitances in a portion of the touch area. In other words, it may be possible to sense a touch and a proximity using the same touch sensing unit, without an additional proximity sensor.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
a substrate;
a display layer on the substrate, and comprising emission areas; and
a touch layer on the display layer, and comprising:
a touch area;
first sensor electrodes located along a first direction, and electrically connected to each other;
second sensor electrodes located along a second direction crossing the first direction, and electrically connected to each other, the second sensor electrodes being electrically insulated from the first sensor electrodes; and
third sensor electrodes located along the first direction, and electrically insulated from the first sensor electrodes and the second sensor electrodes,
wherein, in a first mode, the touch layer is configured to sense amounts of change in first capacitances between the first sensor electrodes and the second sensor electrodes, and
wherein, in a second mode, the touch layer is configured to sense amounts of change in second capacitances between the first sensor electrodes and some of the second sensor electrodes, and amounts of change in third capacitances between the first sensor electrodes and the third sensor electrodes.

2. The display device of claim 1, wherein the third sensor electrodes are further located along the second direction, and the third sensor electrodes that are located along the first direction are electrically connected to each other.

3. The display device of claim 1, wherein the third sensor electrodes are at least partially surrounded by the first sensor electrodes, respectively.

4. The display device of claim 3, wherein the touch layer further comprises conductive patterns surrounded by some of the first sensor electrodes and the second sensor electrodes, respectively, and
wherein the conductive patterns are electrically insulated from the some of the first sensor electrodes and the second sensor electrodes.

5. The display device of claim 4, further comprising a first connection electrode electrically connecting the third sensor electrodes that are adjacent to each other in the first direction to each other,
wherein the first connection electrode is electrically insulated from the first sensor electrodes and the second sensor electrodes.

6. The display device of claim 5, further comprising a second connection electrode electrically connecting the second sensor electrodes that are adjacent to each other in the second direction to each other,
wherein the second connection electrode is electrically insulated from the first connection electrode.

7. The display device of claim 1, wherein the first sensor electrodes, the second sensor electrodes, and the third sensor electrodes do not overlap with the emission areas.

8. The display device of claim 1, wherein the first mode for sensing the first capacitances is defined as a first sensing period, the second mode for sensing the second capacitances and the third capacitances is defined as a second sensing period, and
wherein the first sensing period and the second sensing period alternate with each other.

9. The display device of claim 8, wherein the first sensing period is longer than the second sensing period.

10. A display device comprising:
a substrate;
a display layer on the substrate, and comprising emission areas; and
a touch layer on the display layer, and comprising:
a touch area, the touch area comprising a first touch area configured to sense a touch input, and a second touch area configured to sense a touch input and a proximity input;
first sensor electrodes at the first touch area and the second touch area, and located along a first direction;
second sensor electrodes at the first touch area and the second touch area, and located along a second direction crossing the first direction; and
third sensor electrodes at the second touch area, and located along the first direction,
wherein the first touch area is surrounded by the second touch area, and
wherein the first touch area is located between the third sensor electrodes of the second touch area.

11. The display device of claim 10, wherein the touch layer further comprises a non-touch area at a side of the touch area, and
wherein the second touch area is located within the touch area adjacent to the non-touch area.

12. The display device of claim 11, wherein the third sensor electrodes are surrounded by the first sensor electrodes, respectively.

13. The display device of claim 10, wherein the second touch area comprises a first sub-touch area extending in the first direction, and a second sub-touch area extending in the second direction, and wherein the first sensor electrodes and the second sensor electrodes are located at the first sub-touch area and the second sub-touch area, and the third sensor electrodes are located at the second sub-touch area.

14. The display device of claim 13, wherein, in a first mode, the touch layer is configured to sense amounts of change in first capacitances between the first sensor electrodes and the second sensor electrodes at the first touch area and the second touch area, and wherein, in a second mode, the touch layer is configured to sense amounts of change in second capacitances between the first sensor electrodes and the second sensor electrodes at the first sub-touch area, and amounts of change in third capacitances between the first sensor electrodes and the third sensor electrodes at the second sub-touch area.

15. The display device of claim 13, wherein the second touch area further comprises:

a third sub-touch area extending in the first direction, and not overlapping with the first sub-touch area; and a fourth sub-touch area extending in the second direction, and not overlapping with the third sub-touch area, and wherein the first sensor electrodes and the second sensor electrodes are located at the third sub-touch area and the fourth sub-touch area, and the third sensor electrodes are located at the fourth sub-touch area.

16. A display device comprising:

a substrate;

a display layer on the substrate, and comprising emission areas; and a touch layer on the display layer, and comprising:

a touch area;

first sensor electrodes located along a first direction, and electrically connected to each other;

second sensor electrodes located along a second direction crossing the first direction, and electrically connected to each other, the second sensor electrodes being electrically insulated from the first sensor electrodes;

third sensor electrodes located along the first direction, and electrically insulated from the first sensor electrodes and the second sensor electrodes; and fourth sensor electrodes located along the first direction, and electrically insulated from the first sensor electrodes, the second sensor electrodes, and the third sensor electrodes, wherein, in a first mode, the touch layer is configured to sense amounts of change in first capacitances between the first sensor electrodes and the second sensor electrodes, and wherein, in a second mode, the touch layer is configured to sense amounts of change in second capacitances between the first sensor electrodes and some of the second sensor electrodes, and amounts of change in third capacitances between the first sensor electrodes and the third and fourth sensor electrodes.

17. The display device of claim 16, wherein the third sensor electrodes and the fourth sensor electrodes are located along the second direction, the third sensor electrodes are electrically connected to each other, and the fourth sensor electrodes are electrically connected to each other.

18. The display device of claim 17, wherein the third sensor electrodes and the fourth sensor electrodes are alternately located along the second direction.

19. The display device of claim 17, wherein the third sensor electrodes are surrounded by the first sensor electrodes, and the fourth sensor electrodes are surrounded by the second sensor electrodes.

20. The display device of claim 19, further comprising a third connection electrode electrically connecting the fourth sensor electrodes that are adjacent to each other in the first direction to each other, wherein the third connection electrode is electrically insulated from the second sensor electrodes.

* * * * *